United States Patent [19]

Shiomi et al.

[11] Patent Number: 5,939,844
[45] Date of Patent: Aug. 17, 1999

[54] HIGH-FREQUENCY HORIZONTAL DEFLECTION/HIGH-VOLTAGE GENERATION APPARATUS FOR CATHODE RAY TUBE

[75] Inventors: Katsuhiko Shiomi, Kumamoto-ken; Takafumi Nagasue; Yutaka Sakaue, both of Tamana, all of Japan

[73] Assignee: Matsushita Electric Industrial Co., Ltd., Osaka, Japan

[21] Appl. No.: 08/853,313

[22] Filed: May 8, 1997

[30] Foreign Application Priority Data

May 13, 1996 [JP] Japan .................................... 8-117593
May 13, 1996 [JP] Japan .................................... 8-117609

[51] Int. Cl.⁶ .......................... H04N 3/23; H04N 3/185; G09G 1/00; G09G 1/04
[52] U.S. Cl. .......................... 315/408; 315/370; 315/400; 315/411
[58] Field of Search .................................. 315/317, 370, 315/400, 408, 411

[56] References Cited

U.S. PATENT DOCUMENTS

| | | | |
|---|---|---|---|
| 4,146,823 | 3/1979 | Dietz ........................................ | 315/408 |
| 4,329,729 | 5/1982 | Knight ...................................... | 361/91 |
| 4,625,155 | 11/1986 | Dietz ........................................ | 315/408 |
| 5,283,505 | 2/1994 | Bando ...................................... | 315/411 |
| 5,644,198 | 7/1997 | Park ......................................... | 315/411 |

FOREIGN PATENT DOCUMENTS 57-178475  11/1982  Japan .
5-83578   4/1993   Japan .
5-91360   4/1993   Japan .
5-300392  11/1993  Japan .
7-177739  7/1995   Japan .

Primary Examiner—Edward P. Westin
Assistant Examiner—Shane R. Gardner
Attorney, Agent, or Firm—Venable; Robert J. Frank

[57] ABSTRACT

A high-frequency horizontal deflection/high-voltage generation apparatus capable of setting inductance of a deflecting yoke without being affected by a collector voltage of a horizontal switching transistor and suppressing power loss while increasing a deflecting pulse voltage so that amplitude adjustment and side-pin correction can be effectuated without incurring any appreciable power loss. A voltage which is higher than the collector voltage $V_{CP}$ of the switching transistor is applied to the deflecting yoke. A resonant circuit is provided for applying to the deflecting yoke a voltage pulse of positive polarity and that of negative polarity, i.e., the voltage pulses bearing opposite phase relation to each other, for increasing equivalently the voltage applied across the deflecting yoke. The switching waveform outputted from the resonant circuit is synchronized with a switching operation of a high-speed switching element driven by a voltage induced in a winding of the deflecting transformer. By adjusting the timing of the synchronous switching operation, a crest value of the voltage pulse of negative polarity is changed, whereby amplitude adjustment and side-pin phenomenon correcting operation are realized. For ensuring stability of a high voltage, the primary winding of the deflecting transformer and that of the high-voltage generating transformer are wound around two legs, respectively, of a U-shaped core. Stabilization of the high voltage is realized by adjusting the power source voltage for the resonant circuit.

14 Claims, 16 Drawing Sheets

PRIMARY VOLTAGE OF HIGH-VOLTAGE
GENERATING TRANSFORMER=$V_{CP}+V_{SP2}$

CONTROL VOLTAGE $V_{CP}$ $V_{SP2}$

HIGH-FREQUENCY HORIZONTAL DEFLECTION/HIGH-VOLTAGE GENERATION APPARATUS FOR CATHODE RAY TUBE

BACKGROUND OF THE INVENTION

1. Field of the Invention

The present invention relates to a high-frequency horizontal deflection/high-voltage generation circuit or apparatus which can be employed in a high-frequency display monitor, a television receiver, etc.

2. Description of Related Art

Concerning the realization of a high-frequency deflecting circuit capable of operating at a high frequency, there have heretofore been made various studies and proposals, which will briefly be reviewed to provide a better understanding of the concept underlying the invention.

The following description will be made by reference to FIGS. 7 and 8 in which FIG. 7 is a schematic circuit diagram showing a circuit configuration of a conventional deflecting circuit known heretofore, and FIG. 8 is a waveform diagram for illustrating operation of the same. Referring to FIG. 7, reference numeral 1 denotes a horizontal switching transistor, 2 denotes a damper diode, 3 denotes a resonant capacitor, 4 denotes a deflecting yoke, 5 denotes a deflecting transformer, 6 denotes an S-shaped capacitor, and numeral 7 denotes a power source.

Now, let's consider the problems encountered in the approaches for implementing the deflecting circuit of the structure mentioned above so that it can operate at a high frequency. Studies concerning the behaviors of such deflecting circuit have been made in the past as well, which will be referenced in the following description.

Referring to FIG. 7 in combination with FIG. 8, when the horizontal switching transistor 1 is turned on, a deflecting current flows through the deflecting yoke 4. Upon turning-off of the horizontal switching transistor 1, a resonant high-voltage pulse (of about 1000 to 1200 volts) which is commonly referred to as the fly-back pulse is generated under the effects of a combined inductance of the deflecting circuit and a capacitance of the resonant capacitor 3. At the end of this fly-back period, the damper diode 2 is turned on, as a result of which a deflecting current of negative polarity flows through the deflecting yoke. Thus, by repetition of the on/off operations of the horizontal switching transistor 1 and the damper diode 2, the horizontal deflecting operation can be realized.

When a predetermined raster amplitude W is to be obtained in the horizontal deflecting operation performed at a scanning frequency $F_H$ in the deflecting circuit shown in FIG. 7, the conditions given by the following expression (1) have to be satisfied.

$$W = K_1 I_{DYPP} / \sqrt{E_{HT}} \quad (1)$$

In the above expression (1), $K_1$ represents a constant given by the following expression (2):

$$K_1 / \sqrt{E_{HT}} = \text{Constant} \quad (2)$$

where $E_{HT}$ represents a high voltage of a cathode ray tube (also known as the Braun tube).

Further, a deflecting current $I_{DYPP}$ of the cathode ray tube is given by the expression (3) mentioned below.

$$I_{DYPP} = \frac{B}{L_{DY}} T_S \quad (3)$$

where

B represents a source voltage, $T_S$ represents a scanning time, and $L_{DY}$ represents the inductance of the deflecting yoke.

Referring to FIG. 8 which is a waveform diagram for illustrating operation of the conventional deflecting circuit, relations among the scanning time $T_S$, horizontal period $T_H$ and the fly-back period $T_F$ are given by the expressions (4), (5) and (6) mentioned below:

$$F_H = \frac{1}{T_H} \quad (4)$$

$$T_S = T_H - T_F \quad (5)$$

$$T_F = K_2 T_H \quad (6)$$

where $K_2$ represents a constant.

A collector voltage $V_{CP}$ of the horizontal switching transistor 1 making appearance during the fly-back period $T_F$ in the deflecting operation described above can be expressed as follows:

$$V_{CP} = B\left\{\frac{\pi}{2}\left(\frac{T_H}{T_F} - 1\right) + 1\right\} \quad (7)$$

On the basis of the relations mentioned above, the relation between the inductance $L_{DY}$ of the deflecting yoke and the scanning frequency $F_H$ can be given by the following expression (8):

$$L_{DY} = \frac{B_2}{K_3} \cdot \frac{1}{F_H^2} (1 - K_2)^2 \quad (8)$$

where $K_3$ represents a constant. As can be seen from the above expression (8), the inductance $L_{DY}$ of the deflecting yoke is in inverse proportion to the second power of the scanning frequency $F_H$.

On the other hand, the collector voltage $V_{CP}$ can be given by the following expression (9):

$$V_{CP} = B\left\{\frac{\pi}{2}\left(\frac{K_2}{1 - K_2}\right) + 1\right\} \quad (9)$$

As is apparent from the above expression (9), the collector voltage $V_{CP}$ bears no relation to the scanning frequency $F_H$.

As is apparent from the above analyses, when the collector voltage $V_{CP}$ is sustained to be constant for ensuring a voltage withstanding capability of the horizontal switching transistor 1, the inductance $L_{DY}$ of the deflecting yoke will have to be low in reverse proportion to the operating frequency.

Next, the description will turn to the power consumption behavior of the deflecting circuit. In the conventional deflecting circuit shown in FIG. 7, power losses brought about during the scanning period and the fly-back period will be considered separately. For the losses incurred by the deflecting yoke 4 and the horizontal switching transistor 1, the expressions (10), (11), (12) and (13) mentioned below apply.

$$P_{DYS} = \frac{1}{12} R_{DY} I_{DY}^2 \frac{T_S}{T_H} \tag{10}$$

$$P_F = \frac{1}{12}(L_{DY} I_{DY}^2) F_H \cdot \frac{(1 - \epsilon^{-\pi/2Q})}{(1 + \epsilon^{-\pi/2Q})} \tag{11}$$

$$P_{TRS} = \frac{1}{12} R_S I_{PP}^2 \frac{T_S}{T_H} \tag{12}$$

$$P_S = P_{DYS} + R_{TRS} \tag{13}$$

where $P_S$ represents a loss during the scanning period, $P_F$ represents a loss during the fly-back period, $P_{DYS}$ represents loss incurred by the deflecting coil, $P_{TRS}$ represents loss in the switching transistor, $R_{DY}$ represents resistance of the deflecting yoke, $I_{DY}$ represents deflecting current, $R_S$ represents internal resistance of the switching transistor, $I_{PP}$ represents collector current of the switching transistor, $\epsilon$ represents an exponent, and Q represents a so-called Q-value of the resonance.

As is apparent from the above, the losses of the horizontal switching transistor 1 in both the scanning period and the fly-back period increase as the frequency becomes higher.

Thus, in order to reduce the losses mentioned above, it is effective to equip the deflecting circuit with measures for decreasing the current of the horizontal switching transistor 1. In more concrete terms it will be required to increase the power source voltage and employ a deflecting yoke having twice to three times as high an inductance value as that of the conventional deflecting yoke in order to suppress the above-mentioned loss.

Next, consideration will be paid to the operation for adjusting the amplitude and correcting a so-called side-pin phenomenon, which are important operations of the horizontal deflecting circuit. Operations for adjusting the amplitude and correcting the side-pin phenomenon can be effectuated by changing appropriately the deflecting current $I_{DYPP}$ in the expression (1). As the means for changing the deflecting current $I_{DYPP}$, there has heretofore been employed a circuit for making variable the source voltage B and a circuit for allowing the inductance $L_{DY}$ of the deflecting yoke to change. FIG. 10A shows a configuration of the circuit for making variable the source voltage B. In the circuit shown in FIG. 10 in which a power supply of a voltage +B$_3$ is employed, a voltage drop is caused to take place across the control transistor 153 in order to effectuate the amplitude and side-pin correction as desired. In other words, loss occurs in the control transistor 153. Further, because the crest value of the deflecting voltage +B$_1$ is not constant as can be seen from FIG. 10B, it is impossible to derive a high output voltage of a constant value from the deflecting circuit. Under the circumstances, a circuit referred to as a diode modulator is generally employed in an effort to make constant the crest value of the collector voltage $V_{CP}$. FIG. 11 is a circuit diagram of a typical configuration of such diode modulator circuit. Referring to FIG. 11, the diode modulator is comprised of a first resonant circuit including a deflecting yoke 154 and a resonant capacitor 155, a second resonant circuit composed of a modulator coil 156 and a resonant capacitor 157, and a third resonant circuit composed of a primary winding inductance of a deflecting transformer (also known as the fly-back transformer or FBT in abbreviation) and a distributed capacitance 159 of the deflecting transformer (FBT). Assuming that the resonant circuits mentioned above have the same resonance frequency, the voltage applied to the deflecting yoke 154 is divided between the inductance of the deflecting yoke 154 and that of the modulator coil 156 in proportion to a ratio therebetween. Thus, by changing the source voltage dividing ratio by the control transistor 158, it is possible to realize the amplitude adjustment as well as the side-pin correction. In this operation, the high output voltage of the deflecting circuit will become constant in principle because the collector voltage $V_{CP}$ is constant. In this way, the high output voltage of the deflecting circuit can certainly be made constant without undergoing adverse influences due to the amplitude adjustment and the side-pin correction. However, even with the diode modulator circuit, it is impossible to avoid the power loss brought about by the control transistor 158. Further, the inductance of the deflecting yoke 154 can not be set at a high value because of the presence of the inductance of the modulator coil 156. Besides, due to the distributed capacitance inherent to the deflecting transformer FBT, a limitation is imposed on the resonance frequency with the result in that the primary inductance (i.e., inductance of the primary winding) of the deflecting transformer can not be set at a high value, which in turn means that the current flowing through the horizontal switching transistor 1 will increase thereby incurring a discharge in that the loss increases. Furthermore, due to the necessity of employing large current elements such as the modulator coil 156, the resonant capacitor 157, the control transistor 158, etc. the prior art circuit is not profitable from the economical standpoint either. In this conjunction, the magnitude of the change $K_3$ required for the amplitude adjustment and the side-pin correction can be expressed as follows:

$$K_3 = \frac{L_{Mod}}{L_{DY} + L_{Mod}} \tag{14}$$

In the above expression (14), $L_{MOD}$ represents the inductance of the modulator coil 156. As can be seen from the above, the quantity $K_3$ is restricted by the inductance of the deflecting yoke. For this reason, inductance of the modulator coil 156 has to be set at a low value. In this connection, the inductance L of the deflecting yoke can be expressed as follows:

$$L \propto \frac{n^2 S \mu}{l} \tag{15}$$

where $\underline{n}$ represents the number of turns of the deflecting yoke, l represents a magnetic path length, S represents a cross-sectional area, and $\mu$ represents a specific transmittivity.

As can be seen from the above expression (15), decreasing the inductance of the deflecting yoke means the number of turns of the deflecting yoke must be decreased correspondingly.

Needles to say, the function of the deflecting yoke is not only to effectuate the scanning operation with the current flowing thorough the coil of $\underline{n}$ turns but also to suppress color dislocation (so-called convergence characteristic) of the primary colors RGB on the phosphor screen of the cathode ray tube while ensuring generation of the pictures with possibly minimum distortion. In this conjunction, it is noted that a reduced number of turns of the coil of the deflecting yoke makes it difficult to set an optimal distribution of the magnetic flux or field.

In many examples of the high-frequency deflecting devices known heretofore, the high-voltage generating circuit is implemented separately from the deflecting circuit in order to evade the influence of the former on the latter, the reasons for which may be explained by the facts that a multi-scan system for causing the operating frequency to follow automatically the video signal, a device for allowing the user to perform the adjustment of amplitude and so forth is adopted, as a result of which difficulty is encountered in deriving a stable high voltage from the deflecting pulse. FIG. 9 is a circuit diagram showing schematically a configuration of a high-frequency deflecting circuit known heretofore in which the deflecting circuit and the high-voltage generating circuit are implemented separately from each other. In FIG. 9, reference numeral 8 denotes a deflecting circuit and 9 denotes a high-voltage generating circuit, wherein the deflecting circuit 8 and the high-voltage generating circuit 9 operate independent of each other with the high-voltage generating circuit 9 being provided with a facility detecting a high voltage for thereby controlling the high-voltage generating circuit so that the high-voltage output can be stabilized.

SUMMARY OF THE INVENTION

In the light of the state of the art described above, it is an object of the present invention to provide a high-frequency horizontal deflection/high-voltage generation apparatus which can profitably and advantageously be employed in practical applications by adopting a driving method which makes it possible to set the inductance of the deflecting yoke without being affected by the collector voltage of the horizontal switching transistor, to thereby decrease the power loss of the high-frequency horizontal deflection/high-voltage generation apparatus.

Another object of the present invention is to provide a high-frequency horizontal deflection/high-voltage generation apparatus or circuit in which a high-voltage generating scheme for making it possible to increase the deflecting pulse voltage is adopted so that the amplitude adjustment and the side-pin correction can be effectuated without incurring any appreciable power loss.

In view of the above and other objects which will become apparent as the description proceeds, there is provided according to an aspect of the present invention a high-frequency horizontal deflection/high-voltage generation circuit or apparatus which includes a means for applying a voltage to a deflecting yoke, which voltage is higher than the collector voltage $V_{CP}$ of the switching transistor. To this end, a resonant circuit is provided for applying to the deflecting yoke a voltage pulse of positive polarity and a voltage pulse of negative polarity, i.e., the voltage pulses bearing an opposite phase relation to each other, for thereby increasing equivalently the voltage applied across the deflecting yoke. Further, a means is provided for synchronizing the switching waveform outputted from the resonant circuit with a switching operation of a high-speed switching element driven by a voltage induced in a winding of the deflecting transformer. By adjusting the timing of the synchronous switching operation, a peak or crest value of the voltage pulse of negative polarity is changed, whereby the amplitude adjustment and the side-pin phenomenon correcting operation are realized internally of the deflecting circuit. For ensuring stability for a high voltage, the primary winding of the deflecting transformer and that of the high-voltage generating transformer are wound around two legs, respectively, of a common U-shaped core, wherein stabilization of the high voltage is realized by adjusting the power source voltage for the resonant circuit.

With the arrangement described above, a first resonance voltage produced by a first switching element and a second resonance voltage produced by a second switching element are applied to the deflecting yoke with opposite phases, respectively. Thus, a voltage equivalent to a sum of the first resonance voltage and the second resonance voltage is applied across the deflecting yoke. Consequently, inductance thereof can be set at a high value. As a result of this, the deflecting current can be decreased, which in turn means that loss involved by the switching element can be reduced. Besides, because of the possibility of setting the inductance of the deflecting yoke at a high value, the number of turns n of the deflecting yoke can be increased. In this way, considerable freedom can be ensured for optimal magnetic field design and productivity of the high-frequency horizontal deflection/high-voltage generation circuit for the cathode ray tube can be significantly enhanced.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings.

EMBODIMENT 1

Figure 1:
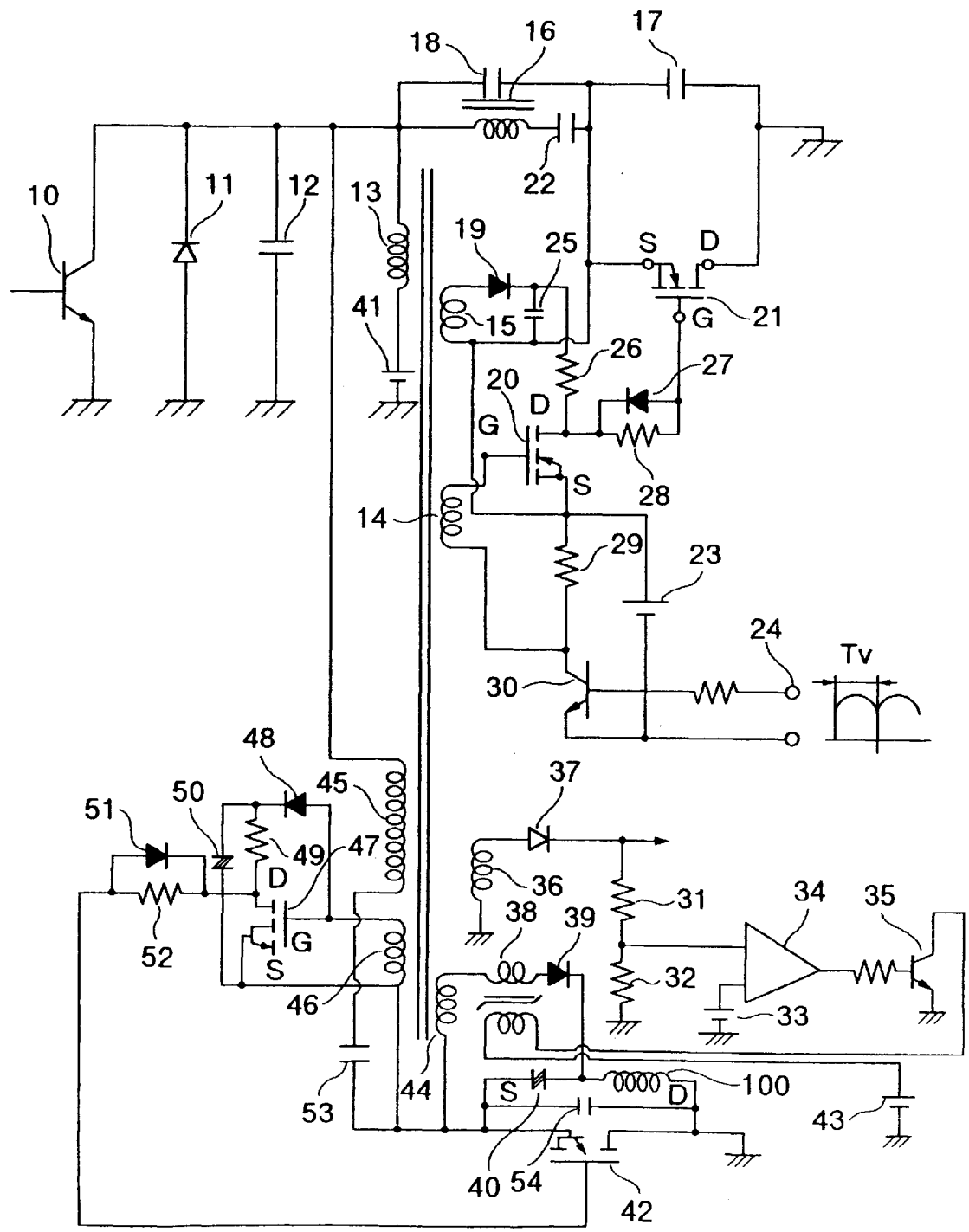
FIG. 1 is a circuit diagram showing a configuration of a high-frequency horizontal deflection/high-voltage generation circuit or apparatus according to a first embodiment of the present invention.

FIG. 1 is a circuit diagram showing a configuration of a high-frequency horizontal deflection/high-voltage generation apparatus according to a first embodiment of the present invention. Referring to the figure, a deflecting circuit constituting a part of the apparatus includes a switching transistor 10 having an emitter grounded (i.e., connected to the ground potential) and a collector to which electric energy is supplied from a power source 41 having one end grounded via a primary winding 13 of the deflecting transformer. Connected to the collector of the switching transistor 10 are a damper diode 11 and a first resonant capacitor 12 which have the respective other ends grounded. Further, a deflecting yoke 16 has one end connected to the collector of the switching transistor 10 and the other end connected to a source terminal of a field effect transistor (hereinafter referred to also as the FET in abbreviation) 21 via an S-shaped capacitor 22, wherein the drain of the FET 21 is grounded. Inserted between the drain and the source of the FET 21 is a second resonant capacitor 17. Further, a third resonant capacitor 18 is connected to the deflecting yoke 16 and the S-shaped capacitor 22.

Now, description will turn to the circuit configurations of a synchronous switching circuit and a phase control circuit incorporated in the high-frequency horizontal deflection/high-voltage generation apparatus according to the instant embodiment of the invention.

Referring to FIG. 1, a secondary winding 15 of the deflecting transformer has one end connected to the source terminals of FETs 21 and 20, respectively, while the other end of the secondary winding 15 of the deflecting transformer is connected to an anode of a rectifying diode 19 the cathode of which is connected to one end of a smoothing capacitor 25, wherein the other end of the smoothing capacitor 25 is connected to the source of the FET 21. A rectified voltage outputted from this circuitry is applied to the drain terminal of the FET 20 via a load resistor 26.

The drain of the FET 20 is connected to the cathode of a diode 27 to which a resistor 28 is connected in parallel, wherein the anode of the diode 27 is connected to the gate of the FET 21. On the other hand, connected to the gate terminal of the FET 20 is one end of positive polarity of a winding 14 while the other end thereof is connected to a junction node between a load resistor 29 and a collector of a control transistor 30, wherein the load resistor 29 and the control transistor 30 constitute an amplifier circuit together with a power source 23. An amplitude/side-pin adjusting or correcting voltage signal is applied to a terminal 24 as an input signal and thus across the base-emitter path of the control transistor 30.

Next, an exemplary structure of the high-voltage generating circuit will be described. Referring continuously to FIG. 1, one end of a high-voltage winding 36 wound in the deflecting transformer is grounded, while the other end thereof is connected to high-voltage detecting resistors 31 and 32 via a high-voltage rectifying diode 37. The voltage appearing across the high-voltage detecting resistor 32 is inputted to a non-inverting terminal of an error amplifier 34, while a reference voltage source 33 is connected to an inverting input terminal of the error amplifier 34. The output terminal of the error amplifier 34 is connected to a base input terminal of a transistor 35 having a collector output terminal connected to a positive-polarity electrode of a power source 43 by way of a saturable reactor 38, while the emitter electrode of the transistor 35 is connected to the ground potential, i.e., grounded. The primary winding 13 of the deflecting transformer and a primary winding 45 of the high-voltage generating transformer are wound around both legs of a U-shaped core, wherein the high-voltage sides of the primary windings 13 and 45 are connected to each other, while the low-voltage side of the primary winding 45 is connected to the source terminal of a FET (field effect transistor) 42 via a capacitor 53, wherein the drain of the FET 42 is connected to the ground potential. A serial connection of an inductor 100 and a smoothing capacitor 40 is inserted between the source terminal and the drain terminal of the FET 42. Additionally, a resonant capacitor 54 is connected in parallel with the source-drain path of the FET 42. On the other hand, a serial connection of the secondary winding 44, a secondary winding of the saturable reactor 38 and a rectifying diode 39 are connected in parallel to the smoothing capacitor 40, whereby a rectifier circuit is implemented.

The high-voltage side of a primary winding 46 is connected to a gate of a FET 47 and the anode of a diode 48. A low-voltage side of the primary winding 46 is connected to a source of the FET 47. The cathode of the diode 48 is connected to the drain of the FET 47 via a resistor 49. A smoothing capacitor 50 for smoothing the output voltage of the diode 48 to supply the smoothed voltage to the drain of the FET 47 is connected between the cathode of the diode 48 and the source of the FET 47. The drain of the FET 47 is connected to the gate of the FET 42 via a resistor 52 and a diode 51 which are connected in parallel.

Now, description will be directed to operation of the high-frequency horizontal deflection/high-voltage generation apparatus implemented in the structure described above.

Figure 2:
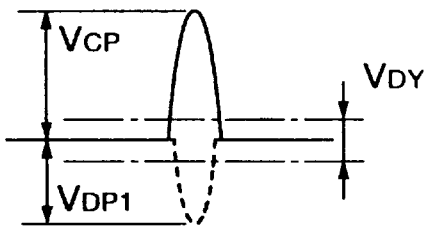
FIG. 2 is a waveform diagram for illustrating a relation between a collector voltage ($V_{CP}$) and a deflecting pulse of negative polarity ($V_{DP1}$) generated in a high-frequency deflecting circuit shown in FIG. 1.

At first, basic operation of the deflecting circuit will be elucidated. Referring to FIG. 1, when the switching transistor 10 is turned on, a current fed from the power source 41 flows through the primary winding 13 of the deflecting transformer, whereby a voltage is induced in the secondary winding 15 of the deflecting transformer, as a result of which an on-signal is applied to the gate electrode of the FET 21. Thus, the drain-source path of the FET 21 becomes conducting (i.e., assumes a conducting state or on-state). At this time, both the switching transistor 10 and the FET 21 assume the on-state, allowing a current to flow through the deflecting yoke 16. In succession, upon starting of the fly-back period, the switching transistor 10 is turned off, whereby a resonant pulse is generated under the effects of parallel inductances of the deflecting yoke 16 and the primary winding 13 of the deflecting transformer as well as the capacitances of the resonant capacitors 18 and 12. In this conjunction, it should be noted that at a time when the resonance starts, the FET 21 is still in the conducting or on-state. At that time, a fly-back pulse is generated by the secondary winding 14 of the deflecting transformer as well. On the other hand, a signal commanding the amplitude adjustment/side-pin correction is applied across the input terminals 24 and hence to the base emitter of the control transistor 30, as a result of which a signal having an inverted and amplified waveform of the input signal is outputted from the collector of the control transistor 30. Since the negative polarity side of the secondary winding 14 of the deflecting transformer is connected to the collector of the control transistor 30 with the positive polarity side of the secondary winding 14 being connected to the gate electrode of the FET 20, there is applied to the gate electrode of the FET 20 a voltage which is induced in the secondary winding 14 and superposed with the waveform of the output of the control transistor 30. When the gate voltage of the FET 20 exceeds a threshold value (or reference value), the FET 20 is turned on, whereby the voltage between the drain terminal and the source terminal of the FET 20 sinks to zero volt. Since the drain-source path of the FET 20 is connected to the gate terminal of the FET 21 via the parallel connection of the diode 27 and the resistor 28, as mentioned previously, the source-drain path of the FET 21 becomes non-conducting (i.e., assumes the off-state). Starting from this time, the second resonant capacitor 17 also plays a role in generation of the resonance. The temporal period during which the FET 21 is non-conducting or OFF corresponds to the time period during which the FET 20 is conducting. In this manner, operations of the FETs 21 and 20 change in dependence on the amplitude/side-pin correcting voltage superposed on the voltage induced in the secondary winding 14. On the other hand, the resonant pulse voltage generated after the switching transistor 10 and the FET 21 are both turned off is applied to the collector of the switching transistor 10 as a deflecting pulse voltage of positive or plus polarity while applied to the source terminal of the FET 21 is a deflecting pulse voltage of negative or minus polarity. Thus, the sum of both the voltages mentioned just above is applied across the deflecting yoke 16, as is illustrated in FIG. 2.

Figure 5:
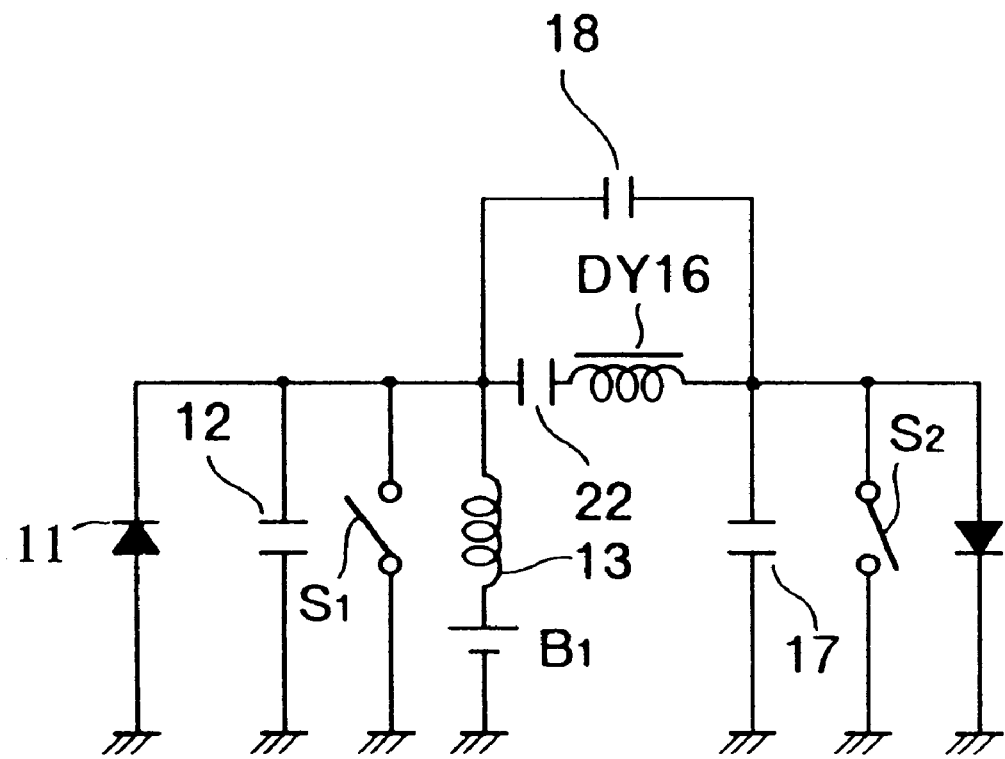
FIG. 5 is an equivalent circuit diagram of a high-frequency deflecting circuit of the high-frequency horizontal deflection/high-voltage generation apparatus according to the first embodiment of the invention.

Operations described above will now be elucidated by reference to FIG. 5 which is an equivalent circuit diagram of the high-frequency deflecting circuit according to the first embodiment of the invention. In the figure, the circuit of concern is assumed as being composed of the switching transistor 10 represented by a switch $S_1$, the FET 21 represented by a switch $S_2$, the first resonant capacitor 12 and the second resonant capacitor 17, for the simplification of illustration. Parenthetically, the switches $S_1$ and $S_2$ are synchronous switches, wherein the switch $S_2$ operates with an adjusted phase or delay relative to the time at which the switch $S_2$ is turned off.

(a) Operation state in which both switches $S_1$ and $S_2$ are on.

Figure 6A:
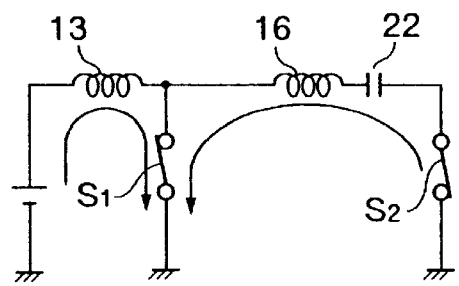
FIGS. 6A, 6B and 6C are equivalent circuit diagrams for illustrating operations of the high-frequency deflecting circuit.

At the start of operation of the high-frequency/high-voltage deflecting circuit, both the switches $S_1$ and $S_2$ are turned on. Thus, the circuit shown in FIG. 5 assumes a state illustrated in an equivalent circuit diagram of FIG. 6A. As can be seen therefrom, a deflecting current increasing linearly flows through the deflecting yoke 16 in this state.

Figure 6B:
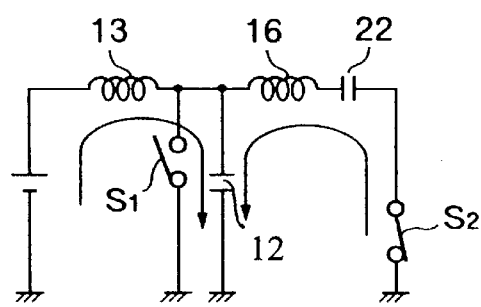

(b) Operation state in which the switch $S_1$ is off with the switch $S_2$ being on (refer to the equivalent circuit diagram shown in FIG. 6B).

In this state, resonance starts under the effects of the parallel inductances of the deflecting yoke 16 and the primary winding 13 of the deflecting transformer and the capacitance of the resonant capacitor 12. However, by taking into consideration that the inductance of the primary winding 13 of the deflecting transformer is remarkably greater than the inductance $L_{DY}$ of the deflecting yoke (i.e., $L_{13} \gg L_{16}$), the resonance pulse may be regarded as being generated through cooperation of the inductance ($L_{DY}$) of the deflecting yoke and the capacitance ($C_{12}$) of the first resonant capacitor 12 at a frequency f given by the following expression:

$$\text{Resonance Frequency } f = \frac{1}{2\pi\sqrt{L_{DY}C_{12}}} \qquad (16)$$

Figure 6C:
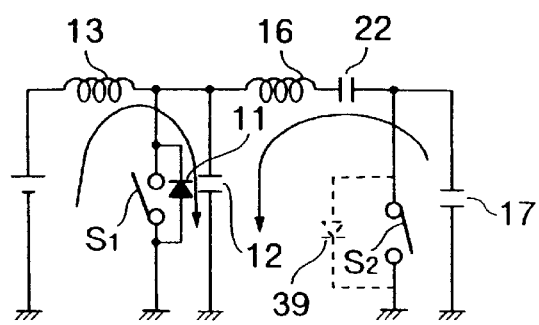
Figure 7:
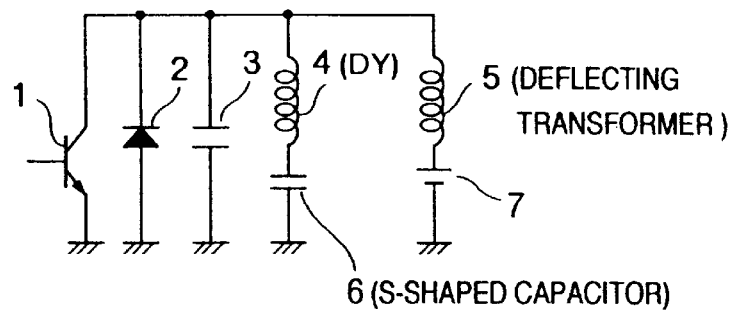
FIG. 7 is a schematic circuit diagram showing a circuit configuration of a conventional deflecting circuit known heretofore.
Figure 8:
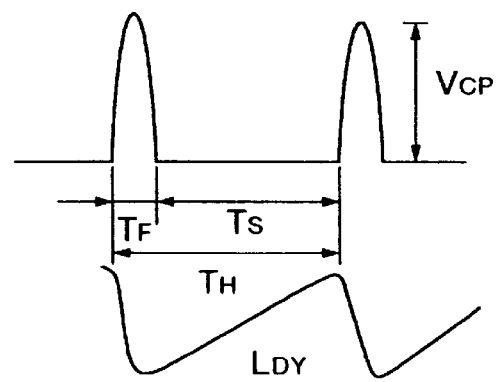
FIG. 8 is a waveform diagram for illustrating operation of the same.
Figure 9:
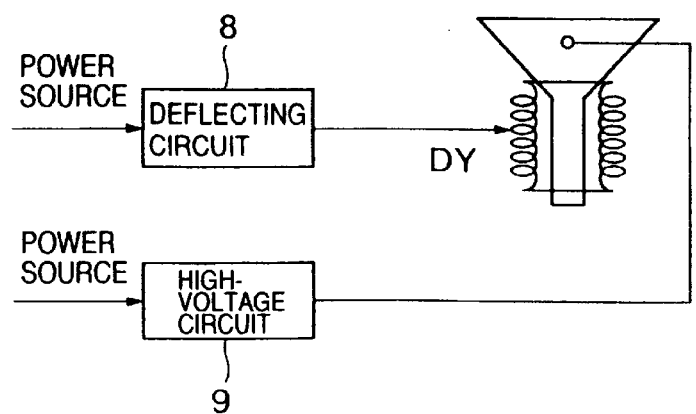
FIG. 9 is a circuit diagram showing schematically a configuration of a high-frequency deflecting circuit known heretofore.
Figure 10A:
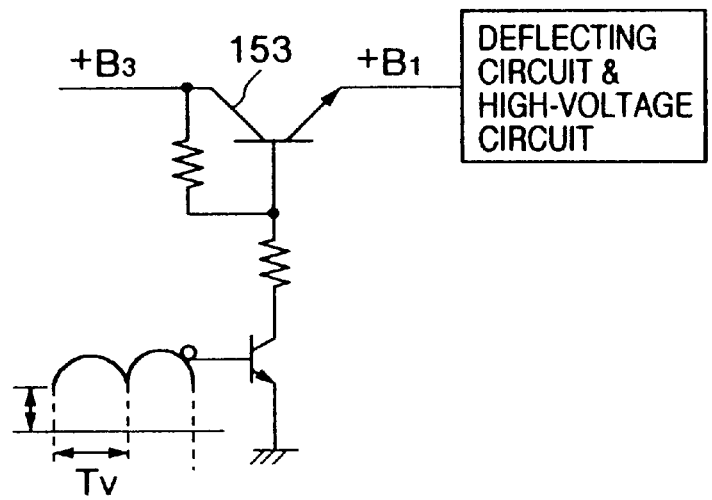
FIG. 10A is a circuit diagram showing a configuration of a conventional circuit for making variable a source voltage of a power source.
Figure 10B:
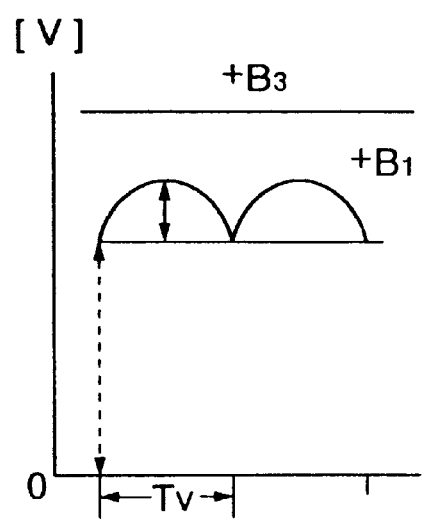
FIG. 10B is a graph showing a waveform of a deflecting voltage.
Figure 11:
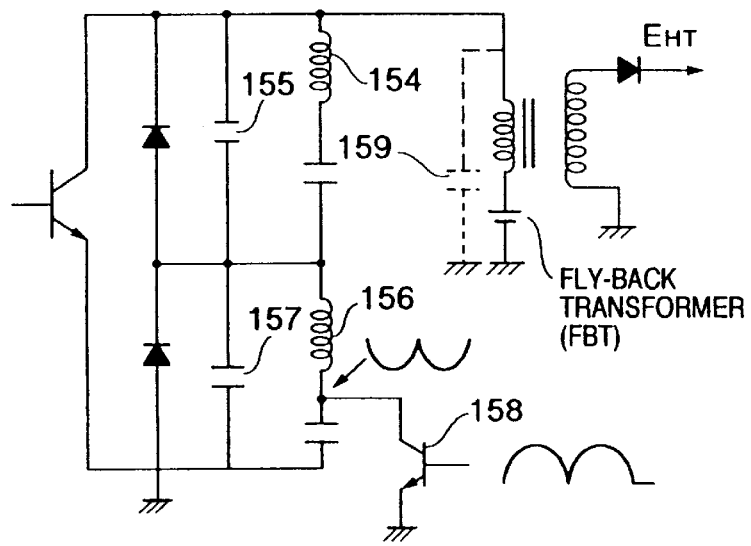
FIG. 11 is a circuit diagram showing a typical configuration of a diode modulator circuit known heretofore.

(c) Operation state in which the switch $S_1$ is turned off with the switch $S_2$ being turned off with a delay time $T_1$ (refer to the equivalent circuit diagram shown in FIG. 6C).

Figure 3:
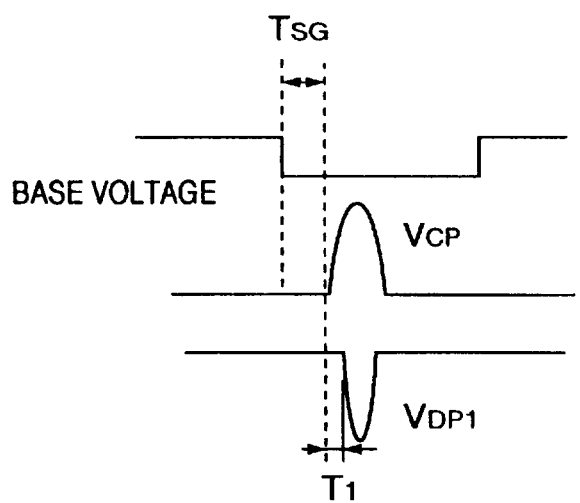
FIG. 3 is a waveform diagram for illustrating delays involved in switching operations.

When the switch $S_2$ is turned off with a delay time $T_1$ after the turn-off of the switch $S_1$, the second resonant capacitor 17 is put into operation, whereby the resonance state described in the above paragraph (b) makes transition to the resonance state of a reference frequency f which can be given by the following expression:

$$\text{Resonance Frequency } f = \frac{1}{2\pi\sqrt{L_{DY} \cdot \frac{C_{12} \cdot C_{17}}{C_{12} + C_{17}}}} \quad (17)$$

where $C_{12}$ and $C_{17}$ represent capacitances of the capacitors 12 and 17, respectively. Upon lapse of a half period of the resonance of the resonant capacitors 12 and 17, the damper diode 11 and the parasitic diode 39 of the FETs coupled in parallel to the switches $S_1$ and $S_2$ are turned on, giving rise to generation of a deflecting current of negative polarity. FIG. 3 is a waveform diagram showing voltage waveforms at both the resonant capacitors, respectively. In the figure, $V_{CP}$ represents the collector voltage of the switching transistor 10 and $V_{DP1}$ represents the source voltage of the FET 21.

(d) Operation state in which the switch $S_1$ is on with the switch $S_2$ being on.

During the scanning period in the operation states (a) to (c) described above, an AC voltage $B_2$ containing the pulse voltages generated across the switch $S_2$ during the scanning period is stored in the S-shaped capacitor 22 by way of the damper diode 11 to be thereby applied to the deflecting yoke. The applied voltage may be represented equivalently by $B_1+B_2$. Through repetition of the operations described above, the deflecting current is generated.

By adjusting the delay time or phase difference $T_1$ in the operation state (c), the voltage $V_{DP1}$ making appearance at the second resonant capacitor 17 can be changed. More specifically, when $T_1=0$, $$D_{DP1} = V_{CP} \times \frac{C_{12}}{C_{12} + C_{17}} \quad (18)$$

and when $T_1=\tfrac{1}{2}T_F$, then $$V_{DP1} = V_{CP} \times \frac{0}{C_{12} + C_{17}} = 0 \quad (19)$$

where $C_{12}$ and $C_{17}$ represent capacitances of the resonant capacitors 12 and 17, respectively.

As is apparent from the above, the voltage $V_{DP1}$ can be adjusted or regulated by adjusting the delay time $T_1$ defined above and/or the capacitance ratio between the first resonant capacitor 12 and the second resonant capacitor 17, whereby the adjustment of the deflecting current can be realized ultimately. In actual operation, however, the width of the fly-back pulse changes too remarkably to be effective in practical applications, depending on the capacitance ratio between the first resonant capacitor 12 and the second resonant capacitor 17. Accordingly, a third resonant capacitor 18 may preferably be connected in parallel with the deflecting yoke so that the capacitance ratio between the resonant capacitors 12 and 17 can be changed at a small rate.

What is important in the operation described above is firstly the collector voltage $V_{CP}$ of the switching transistor 10 and the high-speed synchronous switching operation of the FET 21 and secondly a means for adjusting the delay time or phase difference $T_1$ mentioned previously. Needless to say, adjustment of the delay time $T_1$ has to be performed within the fly-back pulse period. These two important features will be elucidated below.

When a switching element of low switching speed such as a transistor is employed as the second switching element, the switching operation synchronized with the collector voltage $V_{CP}$ can not be carried out because of the large value of the storage time $T_{SG}$ (e.g. not shorter than 2 to 3 μsec in the case of a conventional transistor), thereby rendering it impossible to realize the desired operations. FIG. 3 is a time chart for illustrating the delay time in each of the switching elements. It is desirable that a delay time approximately equal to zero can be realized. Although the switching transistor 10 is turned off with the storage time $T_{SG}$ after the base voltage thereof is changed to zero volt, the fly-back pulse $V_{DP1}$ of the FET is made available owing to the voltage induced in the secondary winding 14. Thus, relative to the collector voltage $V_{CP}$ can be decreased to a possible minimum.

Figure 4:
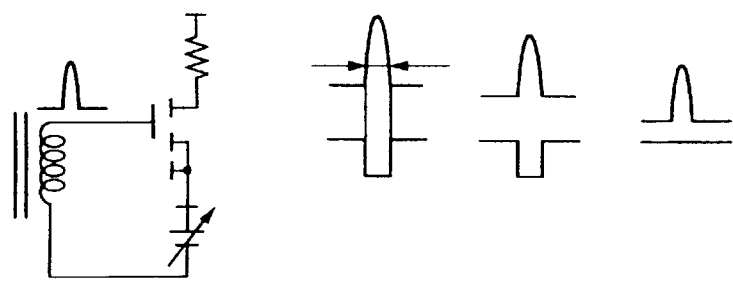
FIG. 4 is a timing chart for illustrating the principle of adjustment of a delay time ($T_1$) during a fly-back period.

Next, description will turn to the operation for adjusting the delay time $T_1$ within the fly-back period. FIG. 4 is a timing chart for illustrating the principle of adjustment of the delay time $T_1$ within the fly-back period. The driving voltage induced in the secondary winding 14 of the deflecting transformer is of a sinusoidal half-waveform similarly to the collector voltage $V_{CP}$. By applying a bias to the secondary winding 14 with a DC voltage applied to the negative polarity side of the secondary winding 14, the phase of operation of the FET 20 can be adjusted with reference to the threshold voltage $V_{SG}$. The FET 20 functions as an inverting comparator which may be implemented in the form of an inverting differential amplifier. Because the fly-back pulse is used as the driving voltage in the case of the instant embodiment of the invention, the range for the phase control has to be so limited that it can be effected during the fly-back pulse period.

In the deflecting circuit described above, operation thereof can be given by the undermentioned expression (20) which is derived from the expression (8) mentioned hereinbefore in conjunction with the prior art deflecting circuit.

$$L_{DY} = \frac{(B_1 + B_2)^2}{K_3} \cdot \frac{1}{F_H^2}(1 - K_2)^2 \quad (20)$$

As can be seen from the above expression, the inductance $L_{DY}$ of the deflecting yoke can be set at a high value. Thus, the transistor collector current $I_{PP}$ deceases, whereby the loss incurred by the transistor (refer to the expression (12)) can be reduced. However, because the FET 21 which is a high-speed switching element having a switching time in a range of 150 to 160 ns presents a load, involving a corresponding loss during the conducting period, it is preferred to select a high-speed switching element which exhibits a small resistance in the on-state as the FET 21.

As described hereinbefore, it is taught according to an aspect of the present invention to adjust the delay time $T_1$ with which the second switch $S_2$ is turned off after the turn-off of the first switch $S_1$. In this conjunction, the capacitance value of the resonant capacitor 17 itself may be controlled by resorting to other control means than that mentioned previously. Alternatively, the capacitance value of the first resonant capacitor 12 may be changed or controlled. Relevant control circuitries are shown in FIGS. 12 and 13, respectively.

Figure 12:
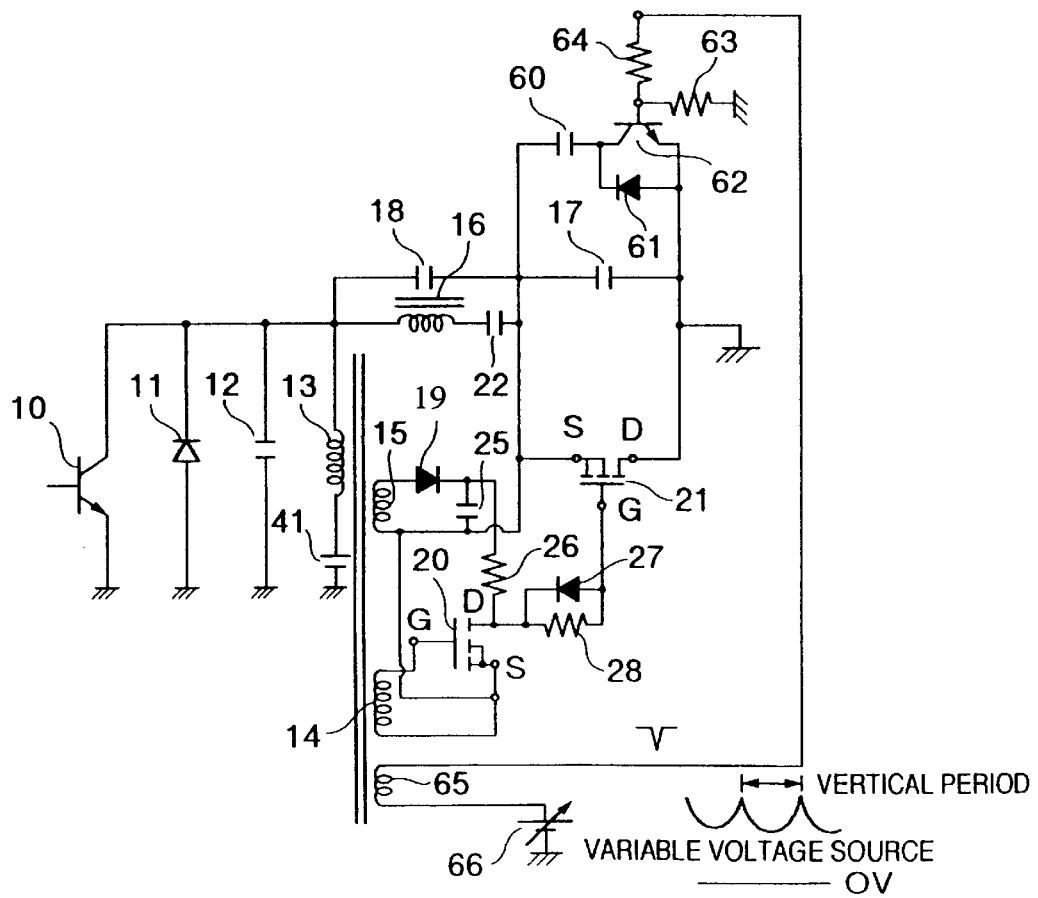
FIG. 12 is a circuit diagram showing a version of the high-frequency horizontal deflection/high-voltage generation apparatus according to the first embodiment of the invention.
Figure 13:
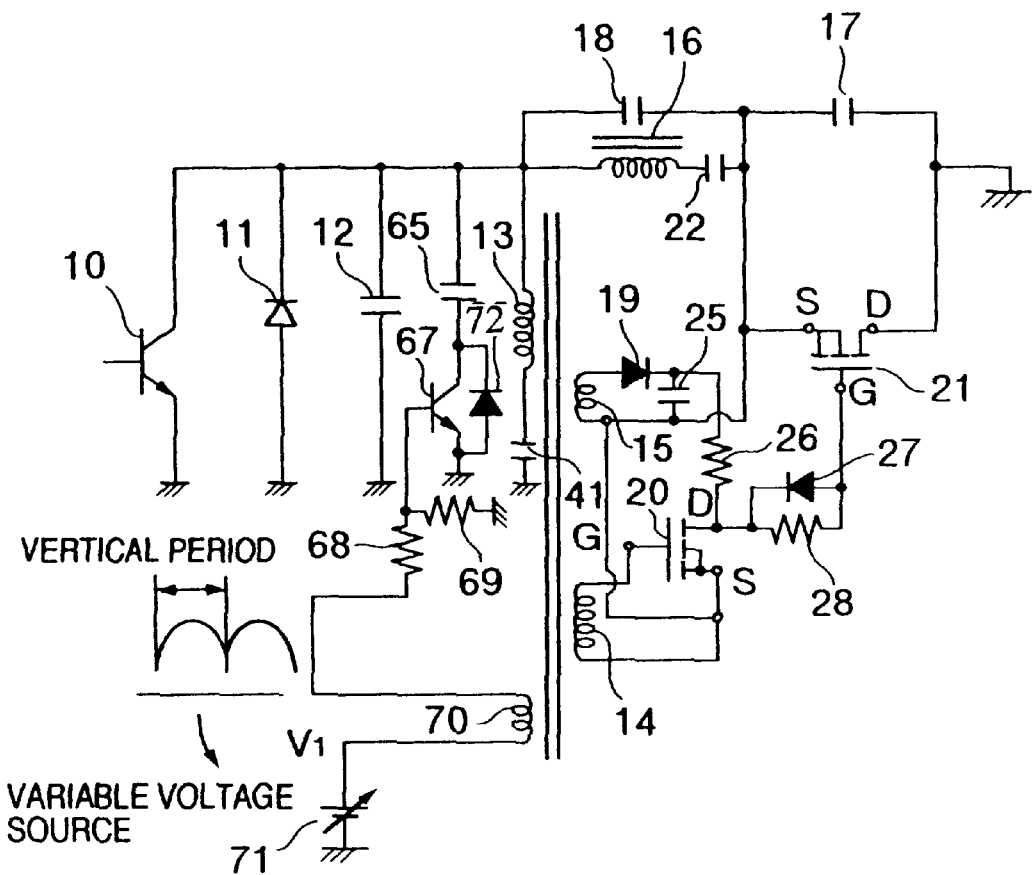
FIG. 13 is a circuit diagram showing another version of the high-frequency horizontal deflection/high-voltage generation apparatus according to the first embodiment.

Referring first to FIG. 12, a switch constituted by the collector-emitter path of a control transistor 62 and a diode 61 is connected in series to a resonant capacitor 60 which is subjected to the control for changing the capacitance thereof. On the other hand, a winding 65 of a deflecting transformer is connected to the base of the control transistor 62 via a resistor 64 to thereby apply a fly-back pulse of negative polarity to the base of the control transistor 62, while the other end of the winding 65 is connected to a variable DC bias voltage source 66 of positive polarity which corresponds to the side-pin amplitude, for the purpose of controlling the turn-on timing of the control transistor 62 by changing the bias applied to the driving pulse for the transistor 62. A resister 63 for the base current adjustment of the control transistor 62 is connected between the base thereof and the ground (i.e., the emitter thereof). By controlling the effective capacitance (time ratio) of the resonant capacitor 60 in this manner, the pulse crest value generated by the FET 21 is changed to thereby realize the operations for the correction of the side-pin phenomenon as well as for the adjustment of the amplitude. With the circuitry shown in FIG. 13, operations similar to those mentioned above are carried out for controlling the time ratio or effective capacitance of the resonant capacitor 65 in FIG. 13 connected to the collector of a control transistor 67, whereby the operations for the side-pin correction and the amplitude adjustment are equally realized. In FIG. 13, a diode 72 is connected between the collector and emitter of the control transistor 67. The base of the control transistor 67 is connected to a variable DC bias voltage source 71 via a resistor 68 for the base current adjustment and a winding 70. A resistor 69 for the base current adjustment of the control transistor 67 is connected between the base thereof and the ground (i.e., the emitter thereof).

Figure 14:
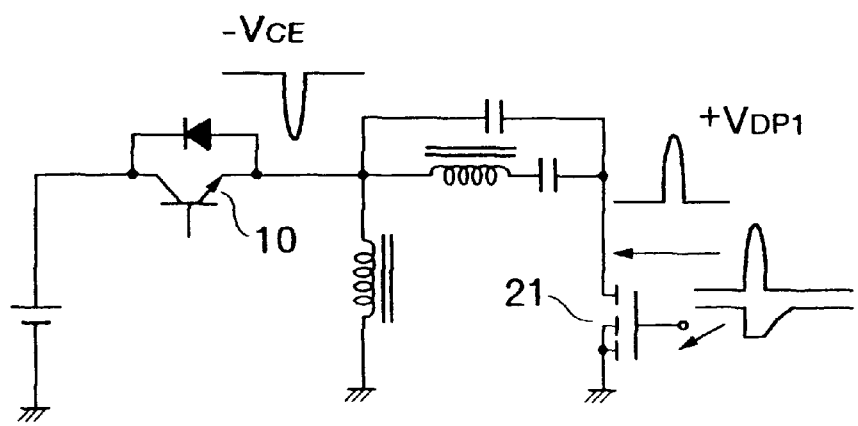
FIG. 14 is a circuit diagram showing yet another version of the high-frequency horizontal deflection/high-voltage generation apparatus.

In conjunction with the high-frequency horizontal deflection/high-voltage generation apparatus according to the instant embodiment of the invention, it is noted that the source terminal of the second switching element 21 is not connected to the ground potential with the amplitude adjustment/side-pin correcting circuitry being adapted to operate in a floating state, which is accompanied with the necessity for using an insulating element. To cope with such situation, an emitter follower circuit configuration may be adopted in which the deflecting yoke is connected to the emitter of the switching transistor 10 with the source terminal of the FET 21 being grounded. An exemplary circuit configuration to this end is shown in FIG. 14.

Although the basic deflecting operation is similar to that of the deflecting circuit descried hereinbefore, there is adopted a method of controlling the inductance value L of the saturable reactor 38 as the high-voltage control means for controlling the source voltage of the third resonance switching circuit. Again referring to FIG. 1, the high output voltage is detected by means of the high-voltage detecting resistors 31 and 32. When the detected voltage falls below the voltage of the reference voltage source 33, the output of the inverting/comparing amplifier 34 increases, to thereby cause the collector current of the control transistor 35 to increase. As a result, the primary control current of the saturable reactor 38 increases, whereby the inductance value L of the secondary winding is lowered. Since the saturable reactor 38 is connected to the secondary winding 44 of the high-voltage generating transformer, the voltage drop due to the inductance is reduced while the rectified voltage is increased, as a result of which the crest value of the resonance voltage applied via an AC coupling capacitor 53 connected to one end of the high-voltage generating transformer becomes high. The voltage applied across the primary winding of the high-voltage generating transformer which corresponds to a sum of the collector voltage $V_{CP}$ and the control voltage $V_{DP2}$ becomes high, which in turn means that the output voltage derived from the secondary winding 36 of the high-voltage generating transformer increases. Thus, the high voltage stabilizing operation can be realized. An important factor to be noted in conjunction with the operation described above is a degree of coupling between the primary winding 13 of the deflecting transformer and the primary winding 45 of the high-voltage generating transformer. In other words, the degree of coupling should be reduced to a predetermined value within a range in which the high-voltage control can be effectuated. It has experimentally been established that in the state in which the coupling degree K between the primary winding 13 of the deflecting transformer and the primary winding 45 of the high-voltage generating transformer wound around two legs, respectively, of the U-shaped core, approaches one, the range in which the high-voltage control can be performed becomes remarkably narrow, useless in practical applications. On the other hand, when the coupling degree K is selected at a value not greater than 0.7, the high-voltage control over a predetermined range (about 30%) can be performed.

For realizing the state in which the coupling degree K is small, the primary winding of the deflecting transformer and that of the high-voltage generating transformer are wound around both legs, respectively, of a common U-shaped core. Similar effect can certainly be realized by using a high-voltage generating transformer having a primary winding wound around a separate core. However, in that case, an additional power consumption for the excitation will be incurred, to a disadvantage. In the case where the coupling degree K is equal to one, the primary voltage of the deflecting transformer is fixed, rendering it impossible to change the primary voltage of the high-voltage generating transformer.

EMBODIMENT 2

Next, description will be made of a high-frequency horizontal deflection/high-voltage generation apparatus according to a second embodiment of the present invention by reference to the drawings.

Figure 15:
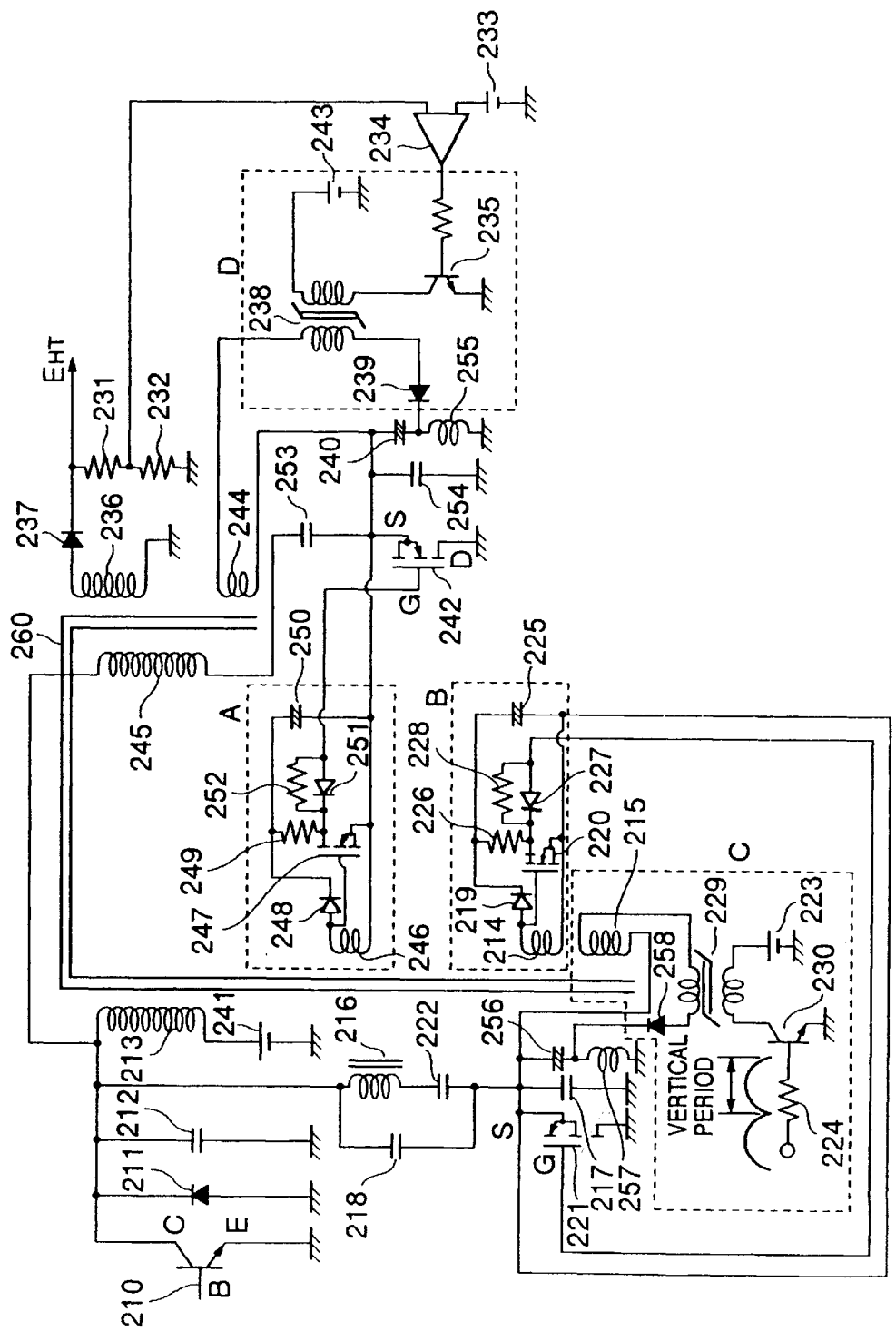
FIG. 15 is a circuit diagram showing a configuration of a high-frequency horizontal deflection/high-voltage generation apparatus according to a second embodiment of the present invention.

FIG. 15 is a circuit diagram showing a configuration of the high-frequency horizontal deflection/high-voltage generation apparatus according to the second embodiment of the invention. Referring to FIG. 15, the deflecting circuit includes a switching transistor 210 having an emitter connected to the ground potential and a collector to which electric energy is supplied from a power source 241 having one end grounded by way of a primary winding 213 of the deflecting transformer. Additionally, connected to the collector of the switching transistor 210 are a cathode terminal of a damper diode 211 and a first resonant capacitor 212 which have the respective other ends thereof connected to the ground potential. Further, a deflecting yoke designated by a numeral 216 has one end connected to the collector of the switching transistor 210 and the other end connected to a source terminal of a field effect transistor (hereinafter referred to also as the FET in abbreviation) 221 via an S-shaped capacitor 222, wherein the drain of the FET 221 is connected to the ground potential. Inserted between the drain terminal and the source terminal of the FET 221 is a second resonant capacitor 217. Further, inserted between the drain terminal and the source terminal of the FET 221 is a serial connection of a choke coil 257 and a smoothing capacitor 256. Connected across the smoothing capacitor 256 is a DC power supply circuit composed of a secondary winding 215 of the deflecting transformer, a secondary winding of a saturable reactor 229 and a rectifier diode 258 which are connected in series to one another. Further, one end of the primary winding of the saturable reactor 229 is connected to a control voltage source 223, while the other end thereof is connected to the collector of a side-pin/amplitude correcting transistor 230, the emitter of which is connected to the ground potential. A control signal for the correction of the side-pin phenomenon and the adjustment of the amplitude is applied to the base of the transistor 230 through a resistor 224.

Now, description will be directed to the circuit configuration of a synchronous switching circuit of the deflecting circuit according to the instant embodiment of the invention. Referring to FIG. 15, the secondary winding 214 of the deflecting transformer has a positive polarity end connected to a gate terminal of a FET 220 with a negative polarity end of the secondary winding 214 being connected to a source terminal of the FET 220. Further, the positive polarity end of the secondary winding 214 is connected to the drain terminal of the FET 220 via a diode 219 and a resistor 226. A smoothing capacitor 225 is connected between the diode 219 and the negative polarity end of the secondary winding 214. The smoothing capacitor 225 smoothes the output voltage of the diode 219 to use the smoothed voltage as a power source of the FET 220. The negative polarity end of the second winding 214 is connected to the source terminal of the FET 221. The output terminal (drain) of the FET 220 is connected to the cathode of a diode 227 to which a resistor 228 is connected in parallel, wherein the anode of the diode 227 is connected to the gate terminal of the FET 221.

Next, description will be directed to an exemplary configuration of the high-voltage generating circuit according to the instant embodiment of the invention. Referring continuously to FIG. 15, one end of a high-voltage winding 236 of the high-voltage generating transformer is grounded, while the other end thereof is connected to a high-voltage rectifier diode 237, wherein the rectified voltage is outputted as a high voltage $E_{HT}$. Further, high-voltage detecting resistors 231 and 232 are connected to the cathode of the high-voltage rectifier diode 237. The voltage appearing across the high-voltage detecting resistor 232 is inputted to an inverting terminal of an inverting amplifier 234, while a reference voltage supplied from a reference voltage source 233 is inputted to a non-inverting input terminal of the inverting amplifier 234. The output terminal of the inverting amplifier 234 is connected to a base terminal of a transistor 235 via a resistor, wherein the collector output terminal of the transistor 235 is connected to a positive or plus polarity electrode of a power source 243 by way of a saturable reactor 238, while the emitter terminal of the transistor 235 is connected to the ground potential (i.e., grounded). The primary winding 213 of the deflecting transformer and a primary winding 245 of the high-voltage generating transformer are wound around both legs of a common U-shaped core 260, wherein the high-voltage sides of the primary windings 213 and 245 are connected to each other, while the low-voltage side of the primary winding 245 is connected to the source terminal of the FET 242 via a capacitor 253, wherein the drain of the FET 242 is connected to the ground potential. A serial connection of a choke coil 255 and a smoothing capacitor 240 is inserted between the source terminal and the drain terminal of the FET 242. Further, a resonant capacitor 254 is connected in parallel with the source-drain path of the FET 242. Furthermore, a serial connection of the secondary winding 244, the secondary winding of the saturable reactor 238 and the rectifying diode 239 are connected in parallel with the smoothing capacitor 240, whereby a rectifier circuit is constituted.

Connected between the gate terminal and the source terminal of the high-voltage control FET 242 is a synchronous switching circuit similar to that of the deflecting circuit described in conjunction with the first embodiment of the invention. More specifically, in the synchronous switching circuit according to the instant embodiment of the invention, the secondary winding 246 of the deflecting transformer has a positive polarity end connected to a gate terminal of a FET 247 with a negative polarity end of the secondary winding 246 being connected to a source terminal of the FET 247. Further, the positive polarity end of the secondary winding 246 is connected to the drain terminal of the FET 247 via a diode 248 and a resistor 249. The output terminal (drain) of the FET 247 is connected to the cathode of a diode 251 to which a resistor 252 is connected in parallel. The anode of the diode 251 is connected to the gate terminal of the FET 242. A smoothing capacitor 250 is connected between the diode 248 and the negative polarity end of the second winding 246. The smoothing capacitor 250 smoothes the output voltage of the diode 248 to use the smoothed voltage as a power source of the FET 247. The negative polarity end of the second winding 246 is connected to the source terminal of the high-voltage control FET 242.

Now, description will be directed to operations of the deflecting/high-voltage generating circuit implemented in the structure described above.

At first, basic operation of the deflecting circuit will be elucidated. Referring to FIG. 15, when the switching transistor 210 is turned on, a current fed from the power source 241 flows through the primary winding 213 of the deflecting transformer, whereby an induced voltage makes appearance across the secondary winding 214 of the deflecting transformer, as a result of which a turn-on signal is applied to the gate terminal of the FET 221. Thus, the drain-source path of the FET 221 becomes conducting (i.e., assumes a conducting state or on-state). At this time, both the switching transistor 210 and the FET 221 assume the on-state, allowing a current to flow through the deflecting yoke. In succession, upon starting of the fly-back period, the switching transistor 210 is turned off, whereby a resonant pulse is generated due to the parallel inductances of the deflecting yoke 216 and the primary winding 213 of the deflecting transformer and the parallel capacitances of the resonant capacitors 218 and 212. In this conjunction, it should be noted that at a time when the resonance starts, the FET 221 is still in the conducting or on-state. At that time point, a fly-back pulse is generated by the secondary winding 214 of the deflecting transformer as well. When the voltage of this fly-back pulse exceeds a threshold voltage (gate voltage) of the FET 220, the latter is turned on. Consequently, the circuit point between the resistor 226 and the drain terminal of the FET 220 assumes the on-level to draw the electric charge from the gate of the FET 221 until it resumes the off-level.

Figure 16:
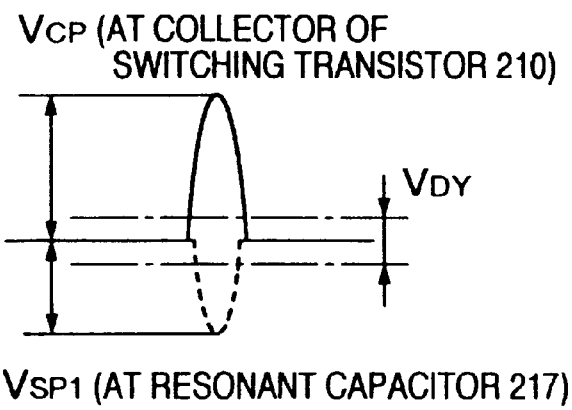
FIG. 16 is a waveform diagram for illustrating a relation between a collector voltage ($V_{CP}$) and a source voltage ($V_{SP1}$) in a high-frequency deflecting circuit according to the second embodiment of the present invention.
Figure 17:
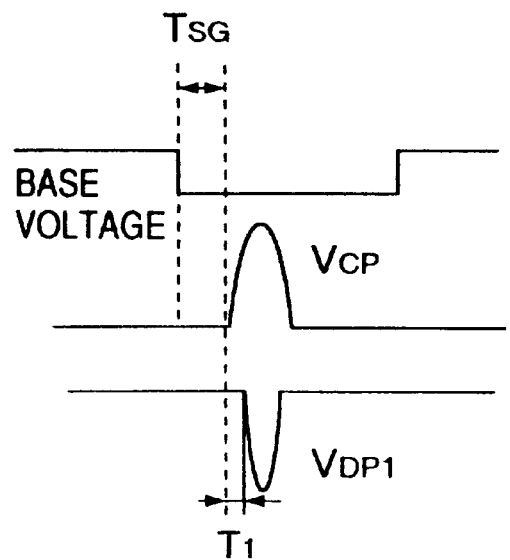
FIG. 17 is a waveform diagram for illustrating delays involved in the operation of the deflecting circuit.

As a result of this, a fly-back pulse is generated through cooperation of the choke coil 257 and the resonant capacitor 217 with the smoothing capacitor 256 serving as a voltage source. Consequently, a positive polarity fly-back pulse $V_{CP}$ (collector voltage of the switching transistor 210) and a negative polarity fly-back pulse $V_{SP1}$ are applied to the deflecting yoke 216, whereby the operation voltage increases equivalently. FIG. 16 is a waveform diagram for illustrating this operation. What is important in this conjunction is realization of the synchronous switching operation with the positive fly-back pulse $V_{CP}$. This can be accomplished by turning off the second switching element (FET) 221 immediately after generation of the fly-back pulse starts upon turning-off of the first switching element (transistor) 210. A corresponding waveform diagram is shown in FIG. 17. As can be seen in the figure, the storage time $T_{SG}$ required for the transistor to turn off usually amounts to a relatively large value on the order of 2 to 3 $\mu$sec. Besides, remarkable variance is found from one to another transistor. For these reasons, it is undesirable to use the transistor as the second synchronous switching element.

Such being the circumstances, it is preferred to use a high-speed switching element such as an FET, IGBT or the like for achieving the desired object of the invention. The delay time $T_1$ shown in FIG. 17 should preferably be as short as possible. However, such operation mode in which the FET is turned off in precedence to the transistor 210 should be avoided because of the possibility of the entire voltage being applied to the FET, poor reliability and impossibility of the synchronous switching operation due to the delay corresponding to the storage time $T_{SG}$. By contrast, according to the teachings of the invention incarnated in the instant embodiment, the FET 221 can be made to turn off after lapse of the delay time $T_1$ in succession to the turn-off of the switching transistor 210 without fail.

Next, the description will turn to the operations for the correction of the side-pin phenomenon and the adjustment of amplitude. As described hereinbefore, the crest value can be controlled by changing the source voltage (voltage of the smoothing capacitor 256) for the negative-polarity pulse generating circuit composed of the FET 221. It is however necessary to distribute the resonant capacitances appropriately in order to assure the range for the control, which will be explained by reference to FIG. 18.

Figure 18:
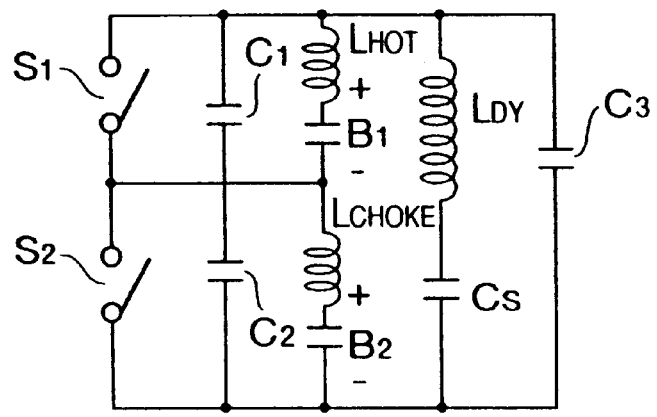
FIG. 18 is a schematic diagram showing a circuit configuration of a resonant circuitry incorporated in the high-frequency deflecting circuit according to the second embodiment of the invention.

In FIG. 18, a switch $S_1$ equivalently corresponds to the switching transistor 210 with a switch $S_2$ to the FET 221, wherein the capacitance of the collector-emitter path of the switching transistor 210 is represented by $C_1$, the capacitance between the drain and the source of the FET 221 is represented by $C_2$ and the capacitance of the deflecting yoke is represented by $C_3$. In order to cause the fly-back pulse $V_{DP1}$ to be variable in dependence on the change of the source voltage $B_2$ while suppressing the change in the width of the fly-back pulse, the following conditions have to be satisfied.

$$L_{DY} \cdot C_3 \approx L_{HOT} C_1 \approx L_{CHOKE} \cdot C_2, \text{ and}$$

$$L_{HOT} \gg L_{CHOKE}$$

Then, the voltage appearing across the switch $S_2$ is low and thus the source voltage $B_2$ can be set at a low level. Under these conditions, the crest value of the fly-back pulse $V_{DP1}$ can be changed in proportional dependence on the change in the voltage level of the source voltage $B_2$, whereby the equivalent voltage applied across the deflecting yoke can be controlled. In this manner, the side-pin correction as well as the amplitude adjustment can be realized. The inductance of the deflecting transformer is set to be several times as high as that of the deflecting yoke with the width of the fly-back pulse being set by the inductance $L_{DY}$ of the deflecting yoke and the resonant capacitances appearing at both ends thereof while the inductance of the choke coil of the second resonant circuit and the capacitance of the resonant capacitor 217 are set in conformance with the width of the fly-back pulse, and the value of the first resonant capacitor 212 is set at a small value. With the power source circuit composed of the winding 215, the secondary winding of the saturable reactor 229, the rectifier diode 258 and the smoothing capacitor, the control current for the side-pin correction and the amplitude adjustment is caused to flow through the primary winding of the saturable reactor 229, whereby operation for the side-pin correction and the amplitude adjustment can be realized.

In the deflecting circuit described above, operation thereof can be given by the undermentioned expression (20) which is derived from the expression (8) mentioned hereinbefore in conjunction with the prior art deflecting circuit.

$$L_{DY} = \frac{(B_1 + B_2)^2}{K_3} \cdot \frac{1}{F_H{}^2}(1 - K_2)^2 \tag{20}$$

As can be seen from the above expression, the inductance $L_{DY}$ of the deflecting yoke can be set at a high value.

Thus, the transistor collector current $I_{PP}$ decreases, whereby the loss incurred by the transistor (refer to the expression (12)) can be reduced. However, because the FET 221 which is a high-speed switching element having a switching time in a range of 150 to 160 ns is employed, involving a corresponding loss during the conducting period, it is preferred to select a high-speed switching element exhibiting a small resistance in the on-state as the FET 221. In the present state of the art, it is preferred to select the switching element having a low resistance in the on-state and capable of withstanding a voltage of 400 to 800 volts.

Figure 20:
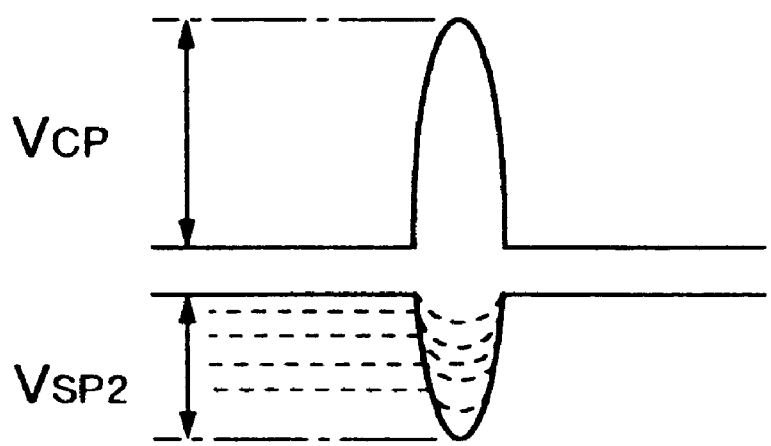
FIG. 20 is a waveform diagram for illustrating the principle of a high voltage control operation in the high-frequency horizontal deflection/high-voltage generation apparatus according to the second embodiment of the invention.

Next, a high-voltage generating operation will be described. In the case of the instant embodiment of the invention, the basic deflecting operation is similar to that of the deflecting circuit described hereinbefore. However, a method of controlling the inductance value L of the saturable reactor 238 is adopted as the high-voltage control means for controlling the source voltage of the third resonance switching circuit. Again referring to FIG. 15, the high output voltage is detected through cooperation of the high-voltage detecting resistors 231 and 232. When the detected voltage lowers below the reference voltage of the reference voltage source 233, the output of the inverting amplifier 234 increases, to thereby cause the collector current of the control transistor 235 to increase. As a result, the primary control current of the saturable reactor 238 increases, whereby the inductance value L of the secondary winding is lowered. Since the saturable reactor 238 is connected to the secondary winding 244 of the high voltage transformer, the voltage drop due to the inductance is reduced while the rectified voltage increases, as a result of which the crest value of the resonance voltage applied via an AC coupling capacitor 253 connected to the low potential side of the high-voltage generating transformer becomes high. The voltage applied across the primary winding of the high-voltage generating transformer which corresponds to the sum of the collector voltage $V_{CP}$ and the control voltage $V_{SP2}$ becomes high, which in turn means that the output voltage derived from the secondary winding 236 of the high-voltage generating transformer increases. In this manner, the high voltage stabilizing operation can be realized. An important factor to be noted in conjunction with the operation described above is the degree of coupling between the primary winding 213 of the deflecting transformer and the primary winding 245 of the high-voltage generating transformer. In other words, the degree of coupling should be decreased to a predetermined value within a range in which the high-voltage control can be effectuated. It has experimentally been established that in the state in which the coupling degree K between the primary winding 213 of the deflecting transformer and the high-voltage generating transformer 245 wound around two legs, respectively, of the U-shaped core, approaches one, the range in which the high-voltage control can be performed becomes remarkably-narrow, being useless in practical applications. On the other hand, when the coupling degree K is selected at a value not greater than about 0.7, the high-voltage control over a predetermined range can be performed. FIG. 20 is a waveform diagram for illustrating the principle of the high voltage control operation in the high-frequency horizontal deflection/high-voltage generation apparatus according to the instant embodiment of the invention.

Figure 19:
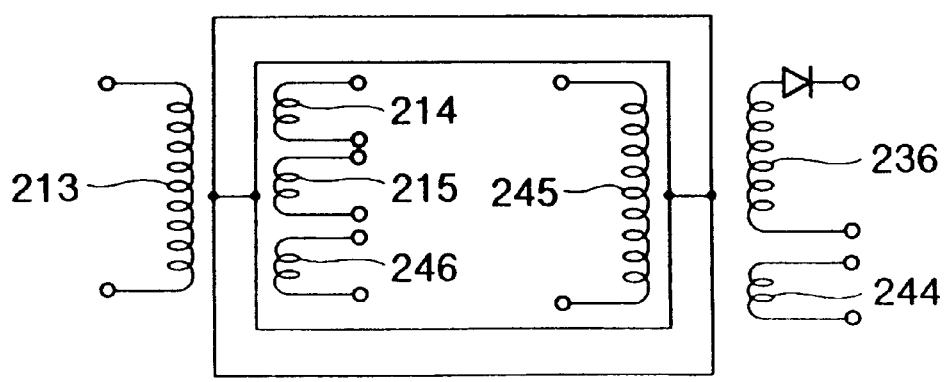
FIG. 19 in an equivalent circuit diagram showing structures of a deflecting transformer and a high-voltage generating transformer, respectively, which are employed according to the second embodiment of the present invention.

For realizing the state in which the coupling degree K is small, the primary winding of the deflecting transformer and that of the high-voltage generating transformer are wound around both legs, respectively, of a common U-shaped core. FIG. 19 shows an equivalent circuit of the deflecting transformer and the high-voltage generating transformer having the respective primary windings wound around two legs of the U-shaped core. Similar effect can certainly be realized by using a high-voltage generating transformer having a primary winding wound around a separate core. However, in that case, additional power consumption for the excitation will be incurred, to a disadvantage. In the case where the coupling degree K is equal to one, the primary voltage of the deflecting transformer is fixed, rendering it impossible to change the primary voltage of the high-voltage generating transformer.

EMBODIMENT 3

Figure 21:
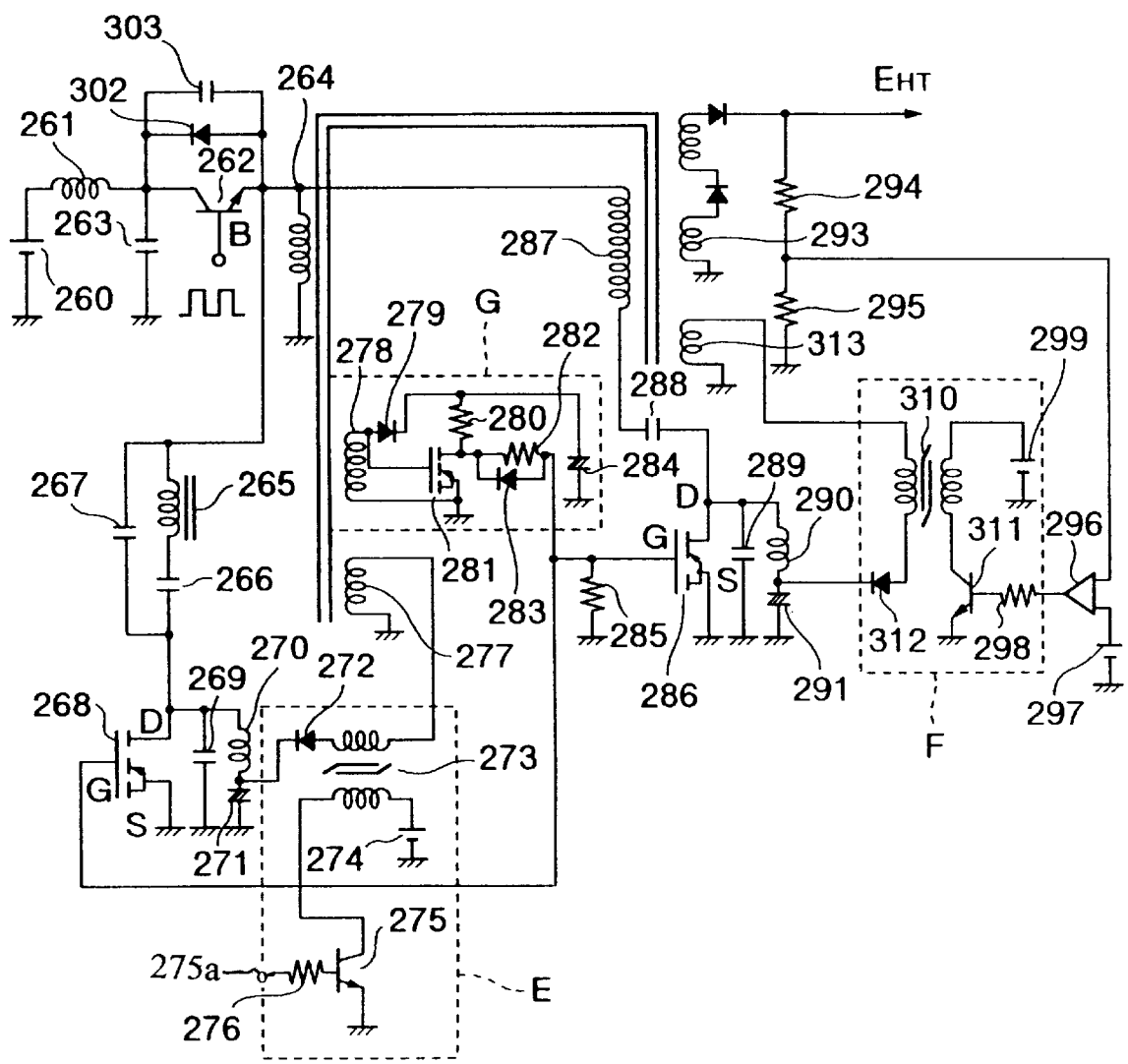
FIG. 21 is a circuit diagram showing a circuit arrangement of a high-frequency horizontal deflection/high-voltage generation apparatus or circuit according to a third embodiment of the present invention.

FIG. 21 is a circuit diagram showing generally a circuit arrangement of the high-frequency horizontal deflection/high-voltage generation apparatus according to a third embodiment of the present invention. Referring to the figure, a first switching transistor 262 constituting a part of the deflecting circuit has a collector which is connected via a choke coil 261 to a positive side of a power source 260 having a negative polarity terminal which is coupled to the ground potential. Further, one end of a capacitor 263 is connected to the collector of the first switching transistor 262. The other end of the capacitor 263 is connected to the ground potential. A parallel connection of a damper diode 302 and a first resonant capacitor 303 is connected in parallel with a collector-emitter path of the first switching transistor 262. Further, one end of a primary winding 264 of the deflecting transformer is connected to the emitter of the first switching transistor 262, while the other end of the former is connected to the ground potential. Additionally, connected in series to the emitter of the first switching transistor 262 is a serial connection of a deflecting yoke 265 and an S-shaped correcting capacitor 266, wherein a third resonant capacitor 267 is connected in parallel with the serial connection of the deflecting yoke 265 and the S-shaped correcting capacitor 266. The other terminal of the S-shaped correcting capacitor 266 located opposite to the deflecting yoke 265 is connected to the drain terminal of a second switching element (FET) 268, the source terminal of which is connected to the ground potential. A second resonant capacitor 269 is connected in parallel with the drain-source path of the second switching element (FET) 268. Further, a serial connection of a choke coil 270 and a smoothing capacitor 271 is connected in parallel with the drain-source path of the second switching element (FET) 268. The gate terminal of the second switching element (FET) 268 is connected to a synchronous switching circuit G which includes a winding 278 of the deflecting transformer, wherein a positive polarity side of the winding 278 being connected to the gate terminal of an FET 281 with the negative polarity side of the winding 278 is connected to the ground potential. Further, the synchronous switching circuit G includes the FET 281 whose source terminal is also connected to the ground potential. The positive polarity side of the winding 278 is connected to a drain terminal of the FET 281 via a diode 279 and a resistor 280. A smoothing capacitor 284 is connected between the diode 279 and ground. The smoothing capacitor 284 smoothes the output voltage of the diode 279 to use the smoothed voltage as a power source of the FET 281. The output terminal (drain terminal) of the FET 281 is connected to a cathode of a diode 283 connected in parallel with a resistor 282, wherein the anode of the diode 283 is connected to the gate terminal of the second switching element (FET) 268. Connected to the positive polarity terminal of the smoothing capacitor 271 is a winding 277 of the deflecting transformer by way of a secondary winding of a saturable reactor 273 and a rectifying diode 272, whereby a DC power supply circuit is formed. One end of the primary winding of the saturable reactor 273 is connected to a control power source 274, while the other end thereof is connected to a collector of a side pin/amplitude correcting transistor 275, the emitter of which is connected to the ground potential while the base thereof is connected to an input terminal 275a via a resistor 276 for a side-pin/amplitude correcting/adjusting control signal.

Next, description will turn to a structure of the high-voltage generating circuit which is implemented substantially similarly to that of the deflecting circuit. More specifically, the high-voltage generating circuit includes a high-voltage generating transformer having a primary winding 287 one end of which is connected to the emitter of the first switching transistor 262 with the other end of the primary winding 287 being connected via a capacitor 288 to the drain terminal of a third switching element (FET) 286 having a source terminal connected to the ground potential. Connected between the drain terminal and the source terminal of the third switching element (FET) 286 are a resonant capacitor 289 and a serial connection of a choke coil 290 and a smoothing capacitor 291, wherein the gate terminal of the third switching element (FET) 286 is connected to the synchronous switching circuitry G of the deflecting circuit. A resistor 285 for the base current adjustment of the FETs 268, 286 is connected between the gate terminal of the FET 286 and ground. The positive polarity terminal of the smoothing capacitor 291 is connected to a rectifier circuit which is constituted by the secondary winding of a saturable reactor 310 and a rectifying diode 312. The high output voltage is obtained by rectifying the output voltage of a secondary winding 293. Resistors 294, 295 for detecting the high output voltage are connected in series between the output terminal $E_{HT}$ and ground. A resistor 298 for the base current adjustment of the transistor 311 is connected to the base thereof. The collector of the transistor 311 is connected to a voltage source 299 via the saturable reactor 310. A tertiary winding 313 supplies voltage to the smoothing capacitor 291 via the saturable reactor 310 and the rectifying diode 312. The connecting point of the resistors 294, 295 is connected to one of two input terminals of a comparator 296. A reference voltage source 297 is connected between the other input terminal of the comparator 296 and ground.

Figure 22:
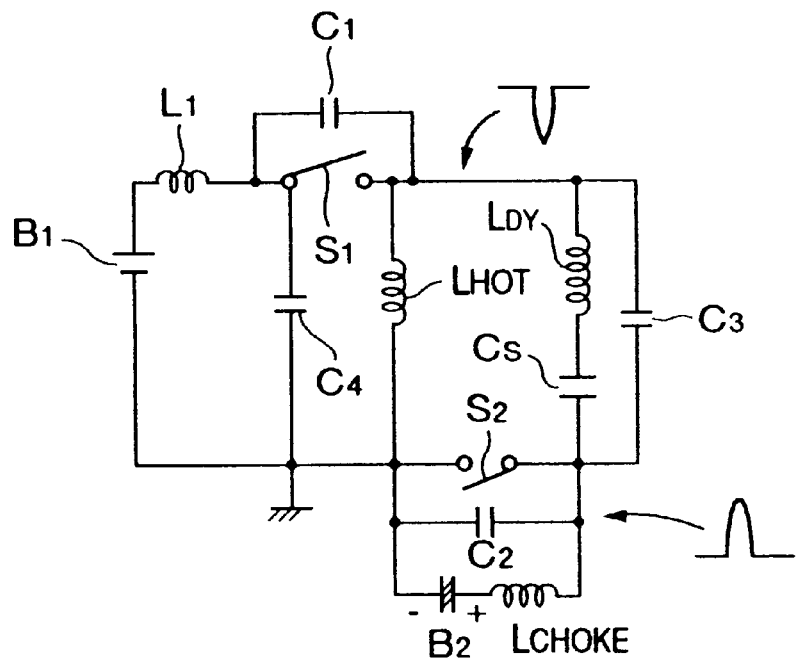
FIG. 22 is a circuit diagram showing a configuration of a resonant circuit incorporated in the high-frequency horizontal deflection/high-voltage generation apparatus according to the third embodiment of the invention.
Figure 23:
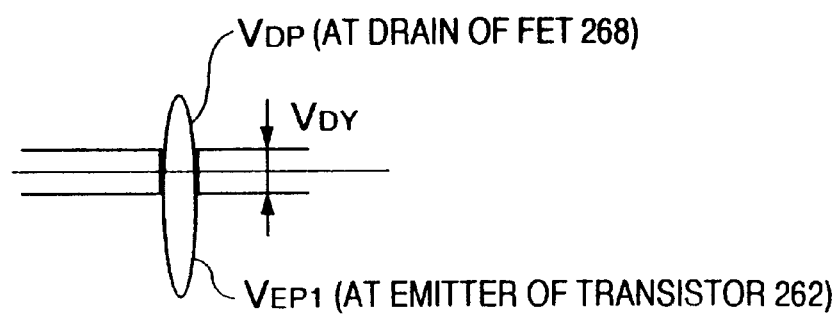
FIG. 23 is a waveform diagram for illustrating an emitter voltage ($V_{EP}$) and a drain voltage ($V_{DP}$) of a switching transistor employed in the high-frequency horizontal deflecting circuit according to the third embodiment of the invention.

Operation of the high-frequency horizontal deflection/high-voltage generation apparatus according to the instant embodiment of the invention will now be described. FIG. 22 is an equivalent circuit diagram showing a basic configuration of the resonant circuit. The resonant circuit now under consideration differs from that of the second embodiment in the respect that the switches $S_1$ and $S_2$ are connected to an inductance $L_{DY}$ and a capacitor $C_S$ by way of a capacitor $C_4$ and an inductance $L_{HOT}$. However, the resonance conditions are essentially same as those described hereinbefore in conjunction with the second embodiment of the invention. In operation, a negative polarity pulse is generated at the emitter of the first switching transistor 262 while a positive polarity pulse is generated at the drain of the second switching element (FET) 268 (see FIG. 23).

The polarity relation in the high-frequency horizontal deflection/high-voltage generation apparatus according to the instant embodiment of the invention is the reverse of that of the apparatus according to the second embodiment. However, substantially the same advantageous effects as those of the second embodiment can be obtained. Namely, the voltage applied to the deflecting yoke 265 increases. The inductance of the deflecting yoke can be set at a high value. Loss or power consumption can be reduced owing to lowering of the deflection current. Concerning the high voltage generating operation and the control operation, advantageous effects similar to those of the second embodiment can be realized by virtue of the arrangement whereby the positive polarity pulse is generated at the drain terminal of the third switching element (FET) 286. One of the most advantageous effects of the high-frequency horizontal deflection/high-voltage generation apparatus according to the third embodiment of the invention is that the source terminals of the second switching element (FET) 268 and the third switching element (FET) 286, respectively, can be connected to the ground potential. In the case of the high-frequency horizontal deflection/high-voltage generation apparatus according to the second embodiment, a negative polarity pulse is generated at the source terminal. Consequently, the synchronous switching circuit must be implemented in a so-called floating state and therefore requires insulation. As a result, the synchronous switching circuits A and B are required for the deflecting circuit and the high-voltage generating circuit, respectively, independent of each other. Such requirements can be avoided in the case of the high-frequency horizontal deflection/high-voltage generation apparatus according to the third embodiment of the invention.

EMBODIMENT 4

Figure 24:
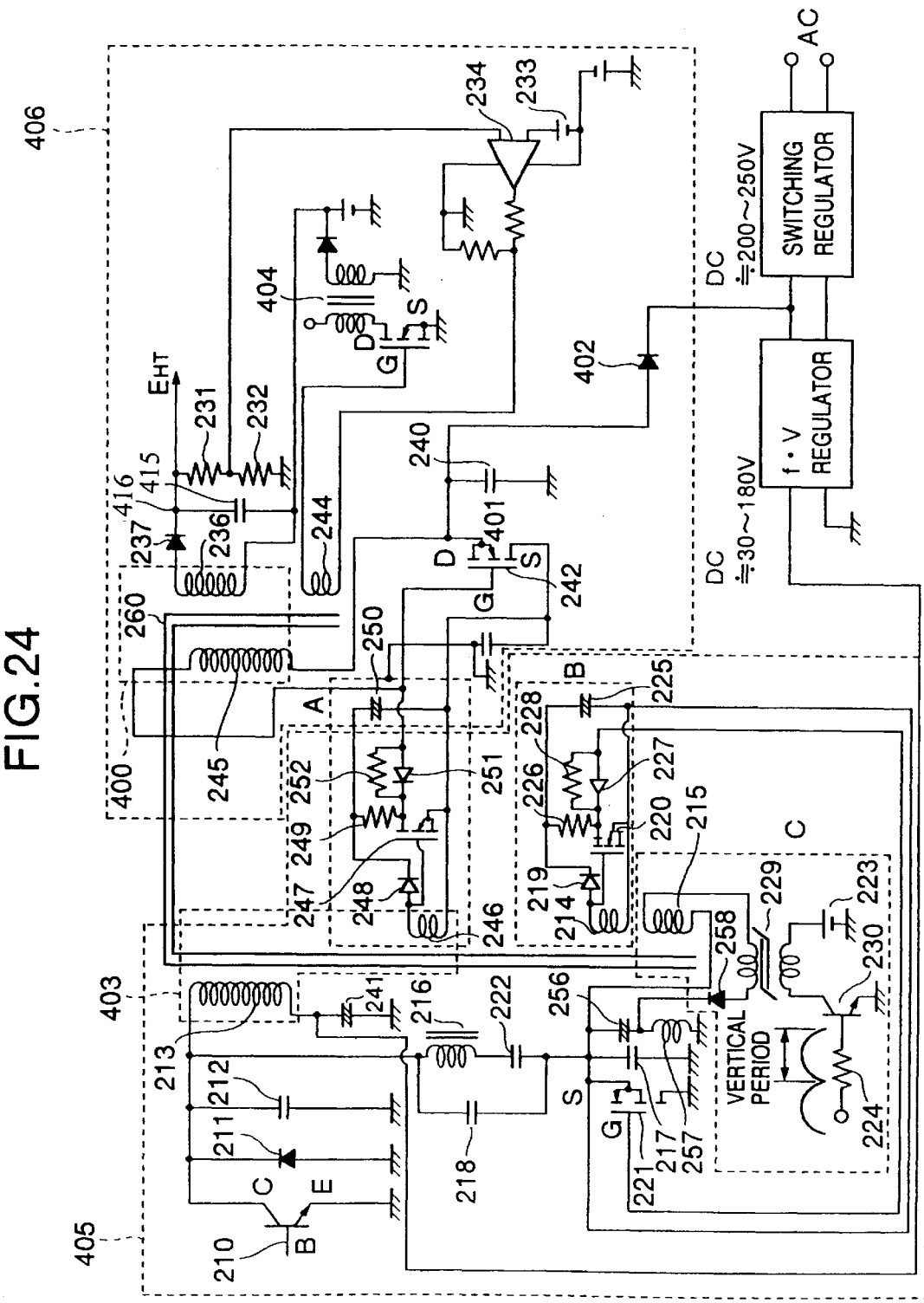
FIG. 24 is a circuit diagram showing a circuit configuration of a high-frequency horizontal deflection/high-voltage generation apparatus according to a fourth embodiment of the present invention.

FIG. 24 is a circuit diagram showing a circuit configuration of the high-frequency horizontal deflection/high-voltage generation apparatus according to a fourth embodiment of the present invention. The high-frequency horizontal deflection/high-voltage generation apparatus according to the instant embodiment is so designed that the high-voltage generating circuit can respond at a high speed. Parenthetically, components similar to those of the high-frequency horizontal deflection/high-voltage generation apparatus according to the second embodiment are denoted by like reference numerals and repetitive description thereof is omitted.

In the case of the high-frequency horizontal deflection/high-voltage generation apparatus according to the fourth embodiment of the invention, the high voltage side of the deflecting transformer and that of the primary winding of the high-voltage generating transformer are not connected together but a synchronous switching circuit similar to that of the deflecting circuit is provided at the primary side of a high-voltage generating transformer 400, as can be seen from FIG. 24. The timing at which a switching element 401 is turned off is synchronized with the timing at which the switching circuitry of the deflecting circuit is turned off. The fly-back pulse voltage generated at that time point is regenerated to a main power source by way of a diode 402 with a view to suppressing variation of the high voltage generated due to the operation frequency, while a variation due to a high-voltage load is so controlled as to fall outside of the fly-back period. The high voltage control circuit is comprised of an auxiliary transformer 404 decoupled from the high-voltage generating transformer 400 and a deflecting transformer 403 and a rectifier circuit connected in series with the low-voltage side of the secondary winding of the high-voltage generating transformer 400 and connected to a high voltage output terminal 416 via a high voltage capacitor 415. In dependence on the high-voltage output, the operation pulse width of the auxiliary transformer 404 is changed in order to ensure stabilization of the high voltage. An important feature of the high-frequency horizontal deflection/high-voltage generation apparatus according to the instant embodiment of the invention resides in that the deflecting circuit 405 and the high-voltage generating circuit are magnetically coupled with the coupling degree of 0.7 to 0.8, wherein the voltage generated by the high-voltage generating transformer is regenerated to the main power source to thereby stabilize easily the high voltage, while high-frequency horizontal deflection/high-voltage generation apparatus is maintained constant during the fly-back period with a DC voltage being applied in dependence on the output voltage described above from the secondary winding of the high-voltage generating transformer. In this way, the high-voltage/high speed control can be accomplished.

Modifications

Many modifications and variations of the present invention are possible in the light of the above techniques. It is therefore to be understood that within the scope of the appended claims, the invention may be practiced otherwise than as specifically described.

Figure 25:
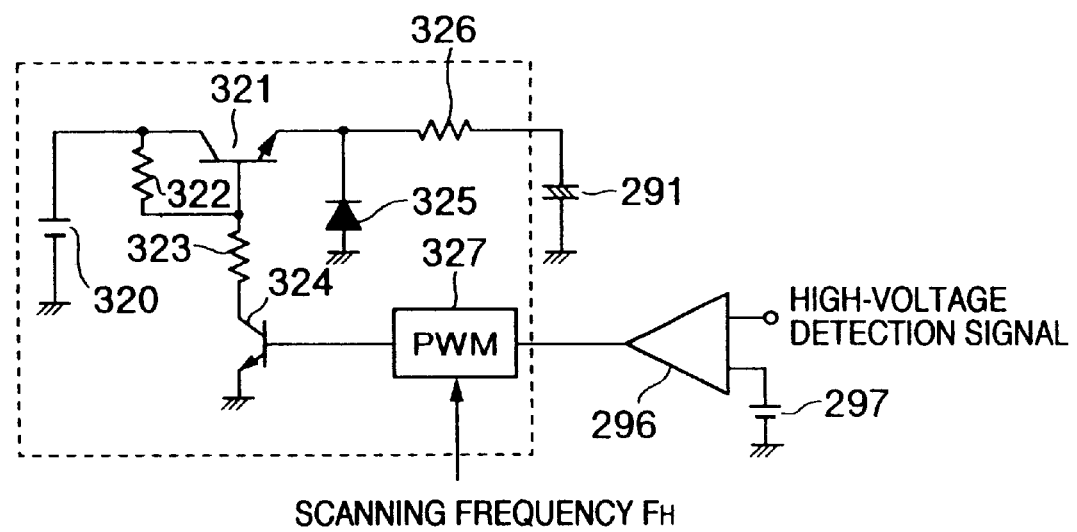
FIG. 25 is a circuit diagram showing a high-voltage generating circuit according to another embodiment of the invention.

By way of example, the voltage control circuit F shown in FIG. 21 may be modified in such a manner as shown in FIG. 25. More specifically, referring to FIG. 25, a positive polarity terminal of an external power supply 320 is connected to the collector of the switching transistor 321, wherein the anode of a fly-wheel diode 325 and a resistor 326 are connected to the emitter of the switching transistor 321. The cathode of the fly-wheel diode 325 is connected to the ground potential. In the switching circuit implemented in the configuration mentioned above, a signal indicative of the result of comparison between the detected high voltage and the reference voltage source 297 is applied to the base of the switching transistor 321 by way of a pulse width modulator or PWM 327 to thereby control the timings at which the switching transistor 321 is turned on and off. By making variable the source voltage of the high-voltage controlling resonant switching circuit which is supplied to the smoothing capacitor 291, stable high-voltage control can be realized. A resistor 322 is connected between the collector and base of the switching transistor 321. The base of the switching transistor 321 is connected to a collector of a transistor 324 via a resistor 323. The base of the transistor 324 is connected to the PWM 327. The emitter of the transistor 324 is connected to ground.

As is apparent from the above, a variety of methods can be conceived for applying the source voltage to the second and/or third resonant switching circuit for achieving the object of the present invention.

Many features and advantages of the present invention are apparent from the detailed description and thus it is intended by the appended claims to cover all such features and advantages of the apparatus which fall within the true spirit and scope of the invention. Further, since numerous modifications and combinations will readily occur to those skilled in the art, it is not intended to limit the invention to the exact constructions and operations illustrated and described. Accordingly, all suitable modifications and equivalents may be resorted to, falling within the spirit and scope of the invention.

What is claimed is:

1. A high-frequency horizontal deflection/high-voltage generation apparatus, comprising:

a deflecting circuit composed of a deflecting transformer, a first switching element, a first resonant capacitor, a deflecting yoke and a second resonant capacitor; and a resonant circuit composed of a second switching element and a third resonant capacitor, wherein said deflecting circuit and said resonant circuit are so connected that a first output waveform of said deflecting circuit and a second output waveform of said resonant circuit bear opposite phase relation to each other with reference to a ground potential, and wherein switching operation of said second switching element is performed by making use of a voltage induced in a winding of said deflecting transformer to thereby realize a synchronous switching operation of said second switching element with said first switching element, said apparatus further comprising:

side-pin correcting means for correcting a side-pin phenomenon, wherein one end of a first winding of said deflecting transformer in which a fly-back pulse voltage is induced is connected to a driving terminal of said second switching element, a DC bias voltage of negative polarity is applied to the other end of said first winding, and wherein said DC bias voltage is made variable for controlling a timing at which said second switching element is turned off to control a crest value of the fly-back pulse generated in said second switching element for thereby realizing a side-pin correction and an amplitude adjustment.

2. A high-frequency horizontal deflection/high-voltage generation apparatus according to claim 1, further comprising:

capacitance varying means for making variable capacitance of said third resonant capacitor which constitutes a part of said resonant circuit.

3. A high-frequency horizontal deflection/high-voltage generation apparatus, comprising:

a deflecting circuit composed of a deflecting transformer, a first switching element, a first resonant capacitor, a deflecting yoke and a second resonant capacitor; and a resonant circuit composed of a second switching element and a third resonant capacitor, wherein said deflecting circuit and said resonant circuit are so connected that a first output waveform of said deflecting circuit and a second output waveform of said resonant circuit bear opposite phase relation to each other with reference to a ground potential, and wherein switching operation of said second switching element is performed by making use of a voltage induced in a winding of said deflecting transformer to thereby realize a synchronous switching operation of said second switching element with said first switching element, said apparatus further comprising:

side-pin correcting means for correcting a side-pin phenomenon by changing capacitance value of said first resonant capacitor which constitutes a part of said deflecting circuit.

4. A high-frequency horizontal deflection/high-voltage generation apparatus, comprising:

a deflecting circuit composed of a deflecting transformer, a first switching element, a first resonant capacitor, a deflecting yoke and a second resonant capacitor; and a resonant circuit composed of a second switching element and a third resonant capacitor, wherein said deflecting circuit and said resonant circuit are so connected that a first output waveform of said deflecting circuit and a second output waveform of said resonant circuit bear opposite phase relation to each other with reference to a ground potential, and wherein switching operation of said second switching element is performed by making use of a voltage induced in a winding of said deflecting transformer to thereby realize a synchronous switching operation of said second switching element with said first switching element, said apparatus further comprising:

a control transistor having an emitter connected to a ground potential and a base connected to said third resonant capacitor by way of a fourth resonant capacitor, wherein a pulse voltage of negative polarity induced in a second winding of said deflecting transformer is applied to a driving terminal of said control transistor from one end of said second winding, and wherein a variable bias voltage for correction of side-pin phenomenon and adjustment of amplitude is applied to the other end of said second winding to control a timing at which said control transistor is turned on for thereby realizing a time duration ratio control of capacitance value of said third resonant capacitor.

5. A high-frequency horizontal deflection/high-voltage generation apparatus, comprising:

a deflecting circuit composed of a deflecting transformer, a first switching element, a first resonant capacitor, a deflecting yoke and a second resonant capacitor; and a resonant circuit composed of a second switching element and a third resonant capacitor, wherein said deflecting circuit and said resonant circuit are so connected that a first output waveform of said deflecting circuit and a second output waveform of said resonant circuit bear opposite phase relation to each other with reference to a ground potential, and wherein switching operation of said second switching element is performed by making use of a voltage induced in a winding of said deflecting transformer to thereby realize a synchronous switching operation of said second switching element with said first switching element, said apparatus further comprising:

a control transistor having an emitter connected to a ground potential and a base connected to said first resonant capacitor by way of a fourth resonant capacitor, wherein a pulse voltage of negative polarity induced in a second winding of said deflecting transformer is applied to a driving terminal of said control transistor from one end of said second winding, and wherein a variable bias voltage for correction of side-pin phenomenon and adjustment of amplitude is applied to the other end of said second winding to control a timing at which said control transistor is turned on for thereby realizing a time duration ratio control of capacitance value of said first resonant capacitor.

6. A high-frequency horizontal deflection/high-voltage generation apparatus, comprising:

a deflecting circuit composed of a U-shaped core, a deflecting transformer having windings wound around one leg of said U-shaped core, a first switching element, a first resonant capacitor, a deflecting yoke and a second resonant capacitor; and a first resonant circuit composed of a second switching element and a third resonant capacitor, wherein said deflecting circuit and said first resonant circuit are so connected that a first output waveform of said deflecting circuit and a second output waveform of said resonant circuit bear opposite phase relation to each other with reference to a ground potential, and wherein switching operation of said second switching element is performed by making use of a voltage induced in a winding of said deflecting transformer to thereby realize a synchronous switching operation of said second switching element with said first switching element, said apparatus further comprising:

high-voltage generating transformer having windings wound around the other leg of said U-shaped core; and a second resonant circuit composed of a third switching element and a fourth resonant capacitor, and connected to a primary winding of said high-voltage generating transformer at a low voltage side thereof, wherein a source voltage for said second resonant circuit is controlled on the basis of a voltage induced in a secondary winding of said high-voltage generating transformer to thereby control a high voltage generated by said high-voltage generating transformer.

7. A high-frequency horizontal deflection/high-voltage generation apparatus, comprising:

a deflecting circuit composed of a deflecting transformer, a first switching element, a first resonant capacitor, a deflecting yoke and a second resonant capacitor; and a resonant circuit composed of a second switching element, a third resonant capacitor and a choke coil, wherein said deflecting circuit and said resonant circuit are so connected that a first output waveform of said deflecting circuit and a second output waveform of said resonant circuit bear opposite phase relation to each other with reference to a ground potential, and wherein synchronous switching operation of said second switching element is performed by making use of a voltage induced in a winding of said deflecting transformer with a delay time relative to switching operation of said first switching element, said apparatus further comprising:

first fly-back pulse width setting means for setting as a width of a fly-back pulse a period of a resonance frequency determined on the basis of a sum of capacitance values of said second resonant capacitor and said first resonant capacitor and inductance of said deflecting yoke, wherein inductance of said choke coil of said resonant circuit and capacitance of said third resonant capacitor are so selected that a period of a resonance frequency determined on the basis of the inductance of said choke coil and the capacitance of said third resonant capacitor is equal to said width of the fly-back pulse, wherein capacitance value of said first resonant capacitor is selected smaller than that of said third resonant capacitor, and wherein a crest value of the fly-back pulse obtained from said resonant circuit is controlled by controlling a voltage applied to said resonant circuit by way of said choke coil for thereby realizing correction of side-pin phenomenon and adjustment of amplitude.

8. A high-frequency horizontal deflection/high-voltage generation apparatus, comprising:

a deflecting circuit composed of a deflecting transformer wound around one leg of a U-shaped core, a first switching element, a first resonant capacitor, a deflecting yoke and a second resonant capacitor; and a resonant circuit composed of a second switching element, a third resonant capacitor and a choke coil, wherein said deflecting circuit and said resonant circuit are so connected that a first output waveform of said deflecting circuit and a second output waveform of said resonant circuit bear opposite phase relation to each other with reference to a ground potential, and wherein synchronous switching operation of said second switching element is performed by making use of a voltage induced in a winding of said deflecting transformer with a delay time relative to switching operation of said first switching element, said apparatus further comprising:

a high-voltage generating transformer having a primary winding wound around the other leg of said U-shaped core; and a switching resonant circuit composed of a third switching element and a fourth resonant capacitor, and connected to said primary winding of said high-voltage generating transformer at a low voltage side thereof, wherein a source voltage for said switching resonant circuit is controlled on the basis of a voltage induced in said high-voltage generating transformer to thereby control a high output voltage generated by said high-voltage generating transformer.

9. A high-frequency horizontal deflection/high-voltage generation apparatus according to claim 7, further comprising:

a power supply circuit for said resonant circuit, said power supply circuit being composed of a power supply winding incorporated in said deflecting transformer, a rectifying diode, and a saturable reactor, wherein when a voltage supplied from said power supply winding is fed to said resonant circuit by way of said rectifying diode, a control current of said saturable reactor is controlled to thereby control said voltage supplied to said resonant circuit for thereby realizing correction of side-pin phenomenon and adjustment of amplitude.

10. A high-frequency horizontal deflection/high-voltage generation apparatus according to claim 8, further comprising:

a first power supply circuit for said resonant circuit, said power supply circuit being composed of a first power supply winding incorporated in said deflecting transformer, a first rectifying diode, and a first saturable reactor, wherein when a voltage supplied from said first power supply winding is fed to said resonant circuit by way of said first rectifying diode, a control current of said first saturable reactor is controlled to thereby control said voltage supplied to said resonant circuit for thereby realizing correction of side-pin phenomenon and adjustment of amplitude; and a second power supply circuit for said switching resonant circuit, said power supply circuit being composed of a second power supply winding incorporated in said deflecting transformer, a second rectifying diode, and a second saturable reactor, wherein when a voltage supplied from said second power supply winding is fed to said switching resonant circuit by way of said second rectifying diode, a control current of said second saturable reactor is controlled to thereby control said voltage supplied to said switching resonant circuit for thereby realizing a high-voltage control.

11. A high-frequency horizontal deflection/high-voltage generation apparatus according to claim 9, further comprising:

said power supply circuit for said resonant circuit includes a power supply winding incorporated in said deflecting transformer, a rectifying diode and a switching element, wherein a voltage of said power supply circuit is controlled by a time duration control for controlling a conducting time of said switching element.

12. A high-frequency horizontal deflection/high-voltage generation apparatus according to claim 10, further comprising:

said power supply circuit for said switching resonant circuit includes a power supply winding incorporated in said deflecting transformer, a rectifying diode and a switching element, wherein a voltage of said power supply circuit is controlled by a time duration control for controlling a conducting time of said switching element.

13. A high-frequency horizontal deflection/high-voltage generation apparatus, comprising:

a transistor element;

a serial connection of a deflecting yoke and a S-shaped capacitor, said serial connection being connected to an emitter of said transistor element;

a field effect transistor element having a drain terminal connected to the other end of said S-shaped capacitor and a source terminal connected to an emitter of said transistor element;

a damper diode having a cathode connected to a collector of said transistor element and an anode connected to said emitter;

a capacitor having one end connected to the collector of said transistor element and the other end connected to the ground potential;

a power source having a positive electrode connected to the collector of said transistor element by way of an inductance element, and a negative electrode connected to the ground potential;

a deflecting transformer having a primary winding connected between the emitter of said transistor element and the ground potential;

a first resonant capacitor connected between the collector and emitter of said transistor element;

a second resonant capacitor and a serial connection of a choke coil and a smoothing capacitor connected between the drain and source terminals of said field effect transistor; and a third resonant capacitor connected across a serial connection of said deflecting yoke and said S-shaped capacitor.

14. A high-frequency horizontal deflection/high-voltage generation apparatus, comprising:

a deflecting circuit including a deflecting transformer wound around one leg of a U-shaped core; and a high voltage generating circuit including a high-voltage generating transformer wound around the other leg of said U-shaped core;

wherein degree of coupling between primary windings of said deflecting transformer and said high-voltage generating transformer is so selected as to fall within a range of 0.7 to 0.8, wherein electric energy of said high-voltage generating transformer is regenerated to a power source for thereby stabilizing a high voltage, while change brought about by a high-voltage load is so controlled as to take place outside of a fly-back period, while Q of resonance being maintained constant within the fly-back period, an auxiliary transfer decoupled to said high-voltage generating transformer, said auxiliary transformer having a DC output voltage terminal connected to a low-voltage terminal of a secondary winding of said high-voltage generating transformer; and a high-voltage capacitor connected between a high-voltage output terminal and a low-voltage terminal of the secondary winding of said high-voltage generating transformer, wherein stabilization of high voltage is realized by controlling the DC output voltage of said auxiliary transformer.

* * * * *